United States Patent
Kats et al.

(10) Patent No.: US 9,871,902 B2
(45) Date of Patent: Jan. 16, 2018

(54) METHODS AND SYSTEMS FOR MANAGEMENT OF VIDEO AND RING TONES AMONG MOBILE DEVICES

(71) Applicant: Vyng, Inc., Santa Monica, CA (US)

(72) Inventors: Paul Kats, Los Angeles, CA (US); Jeffrey Chernick, Venice Beach, CA (US); Mark Randall Goldston, Beverly Hills, CA (US); Arthur Herman Haedike, III, Altadena, CA (US); Sohrab Pirayesh, Los Angeles, CA (US)

(73) Assignee: Vyng, Inc., Santa Monica, CA (US)

( * ) Notice: Subject to any disclaimer, the term of this patent is extended or adjusted under 35 U.S.C. 154(b) by 0 days.

(21) Appl. No.: 15/469,772

(22) Filed: Mar. 27, 2017

(65) Prior Publication Data
US 2017/0201608 A1    Jul. 13, 2017

Related U.S. Application Data

(63) Continuation of application No. 15/142,200, filed on Apr. 29, 2016, now Pat. No. 9,609,124.

(60) Provisional application No. 62/155,706, filed on May 1, 2015.

(51) Int. Cl.
*H04M 3/42* (2006.01)
*H04M 1/57* (2006.01)
*H04M 1/725* (2006.01)
*H04M 19/04* (2006.01)

(52) U.S. Cl.
CPC ....... *H04M 1/576* (2013.01); *H04M 1/72522* (2013.01); *H04M 3/42051* (2013.01); *H04M 19/041* (2013.01); *H04M 3/42042* (2013.01)

(58) Field of Classification Search
CPC ... G06C 30/0267; G06C 50/01; H04M 19/04; H04M 3/436; H04M 3/53383; H04M 3/02; H04M 3/42051; H04W 4/18; H04L 51/10; H04L 67/02; H04L 67/26; H04L 67/303
See application file for complete search history.

(56) References Cited

U.S. PATENT DOCUMENTS

| | | | |
|---|---|---|---|
| 9,002,410 B2* | 4/2015 | Tsui | H04M 19/04 455/414.1 |
| 2004/0005880 A1* | 1/2004 | Shanahan | H04M 1/72527 455/418 |
| 2007/0161382 A1 | 7/2007 | Melinger et al. | |
| 2011/0051914 A1 | 3/2011 | Neuman et al. | |
| 2012/0036440 A1 | 2/2012 | Dare et al. | |
| 2012/0102409 A1 | 4/2012 | Fan et al. | |

(Continued)

FOREIGN PATENT DOCUMENTS

WO    WO 2016178984    11/2016

OTHER PUBLICATIONS

USPTO, "U.S. Appl. No. 15/142,200, Non-Final Office Action dated Jul. 28, 2016", 13 pages.

(Continued)

*Primary Examiner* — Kwasi Karikari
(74) *Attorney, Agent, or Firm* — Strategic Patents, P.C.

(57) ABSTRACT

Provided herein are methods and systems for a sender-controlled contact media content type that can be sent among mobile devices, including addressing the contacts systems and methods of such devices to provide rich interactions among users upon the occurrence of contact events.

18 Claims, 34 Drawing Sheets

(56) References Cited

U.S. PATENT DOCUMENTS

2013/0093719 A1     4/2013   Tokutake et al.
2013/0303151 A1*   11/2013   Johnson ................ H04W 4/003
                                                                                    455/419

OTHER PUBLICATIONS

USPTO, "U.S. Appl. No. 15/142,200, Notice of Allowance dated Jan. 20, 2017", 12 pages.
ISA, "PCT Application No. PCT/US16/30083 International Search Report and Written Opinion dated Jul. 29, 2016", 11 pages.

* cited by examiner

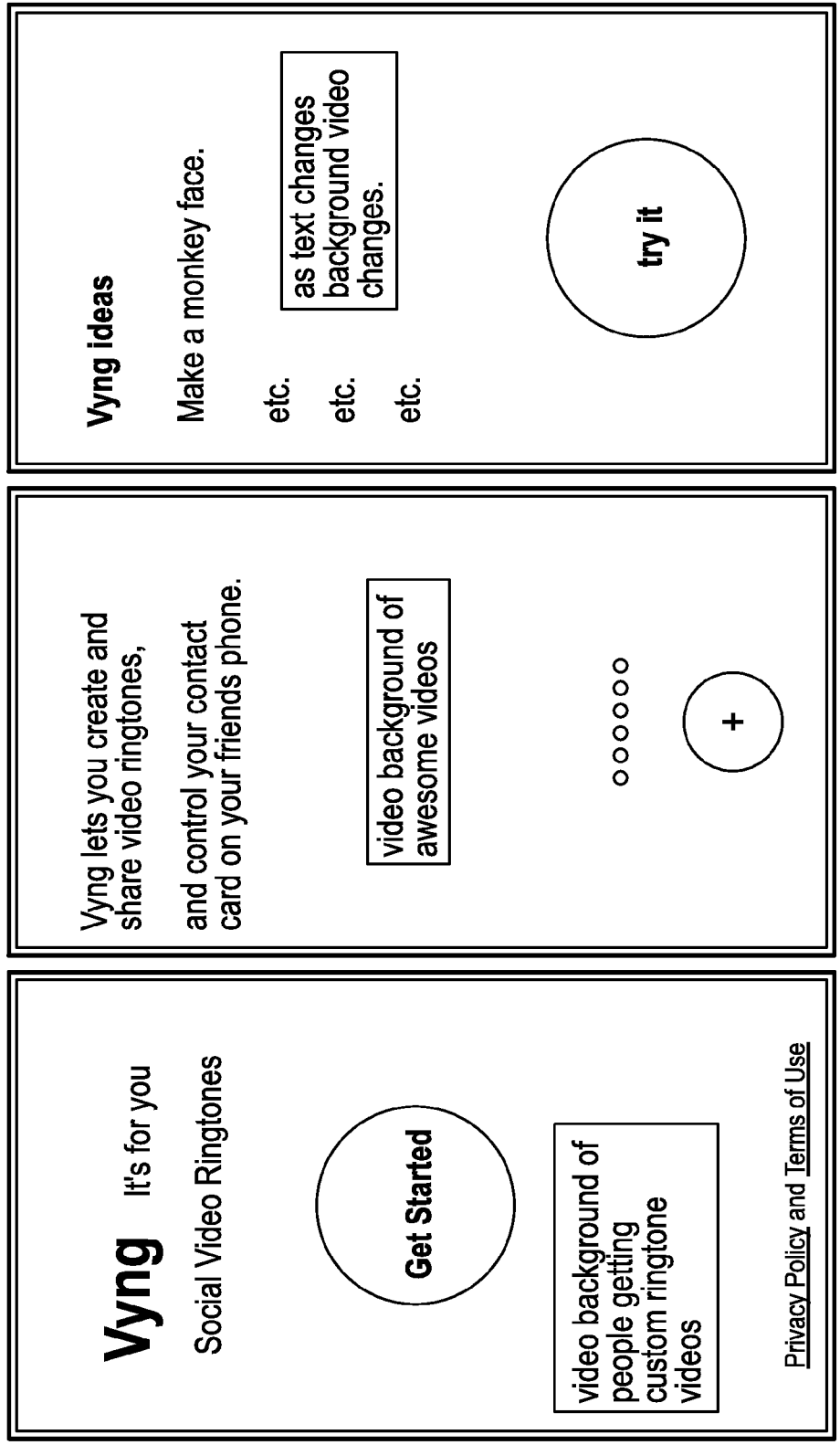

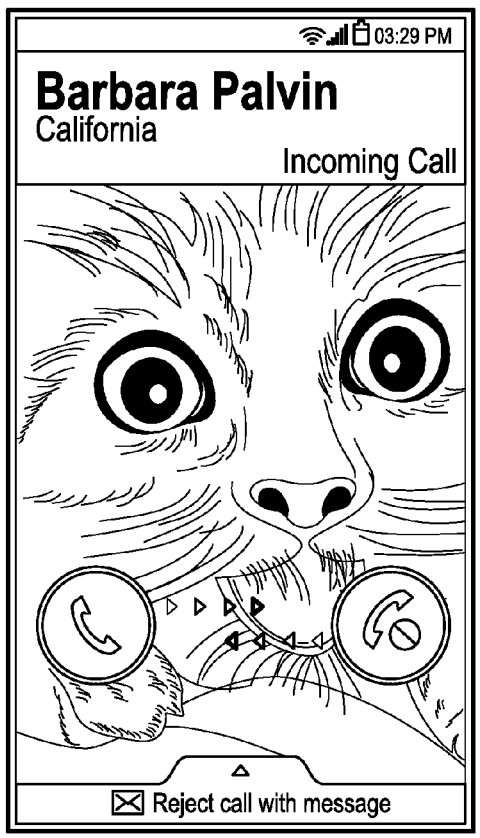
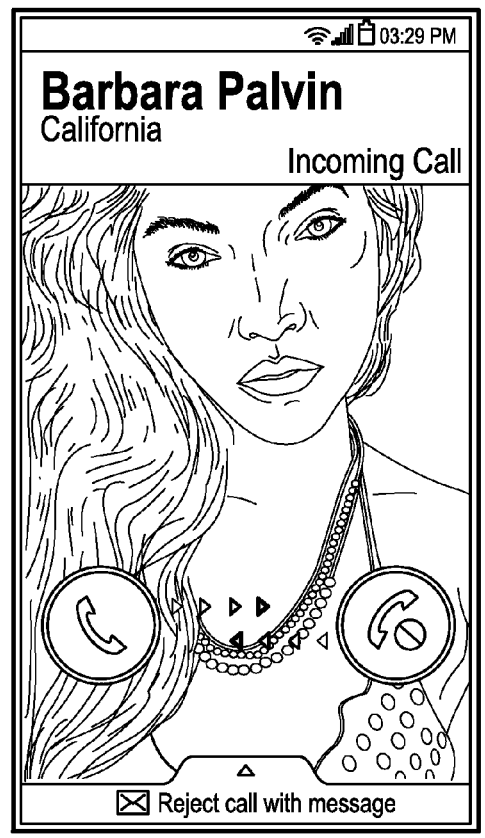
FIG. 4E  FIG. 4F

Notifications

- Like
- Re-Vyng (Add to your Library)
- Comment
- More (Report This Post)

Record button is fixed to bottom right
Video plays without audio as you scroll down.
Tap maximizes video, plays the audio.

Audio Capture

+ show add audio menu

Post Audio

1. audio filters
2. add caption or message
3. add music

METHODS AND SYSTEMS FOR MANAGEMENT OF VIDEO AND RING TONES AMONG MOBILE DEVICES

RELATED APPLICATIONS

This application is a continuation of U.S. patent application Ser. No. 15/142,200 filed on Apr. 29, 2016, which claims the benefit of U.S. Provisional App. No. 62/155,706 filed on May 1, 2015, where the entire contents of the foregoing applications are hereby incorporated by reference.

TECHNICAL FIELD

This application relates to the field of mobile devices, and more particularly to the management of content, such as ring tones and video, that can be played when one user contacts another via a mobile device.

BACKGROUND

The proliferation of mobile devices has enabled a wide range of highly personalized social interactions, such as sharing of photos, videos, and music, among other types of content. However, the contact function of a typical mobile device is quite generic, typically providing an alphabetized list of names, with phone numbers and other basic contact information. Calls and texts between users typically identify the user, and may even play a selected ring tone that is selected by the recipient of the call or text to play when a particular individual calls or texts, but the event of a call or text is otherwise un-customized.

Users might create content that could be played upon contact events, but in current systems another user would need to undertake significant interactions in order for them to be played, and the content would tend to go stale without significant effort on the part of a receiver of a call or text.

A need exists for improved methods and systems for managing the contacts modules and functions of mobile devices.

SUMMARY

Provided herein are methods and systems for a sender-controlled contact media content type (referred to herein in some cases as "SCCMC") that can be sent among mobile devices, including addressing the contacts systems and methods of such devices to provide rich interactions among users upon the occurrence of contact events. Such methods and systems may occur at the level of the contacts functions of a mobile device, such as being initiated directly upon a contact independent of the need for an application on the recipient's mobile device. In embodiments, the SCCMC can play, for example, on the lock screen of the recipient's mobile device as an incoming call occurs, or the SCCMC can display on a contact screen when the phone is unlocked and active, including, without limitation, on the home screen of the recipient's mobile device, on a screen that displays when the recipient is on a phone call and/or when the recipient is using an application on the recipient's mobile device. The methods and systems described herein may allow a first user (user A) to create custom photos, videos, ring tones and the like that are played, under control of user A, on the mobile device of another user (user B), such as when user A calls or texts user B's device. For example, user A may create a video, with associated audio content, and deliver that content to user B's phone, and have the video and audio play on user B's phone when user A contacts user B, such as by text or call. The content may, in a single broadcast act, comprise both voice layer and data layer content and use, in a coordinated fashion, voice layer and data layer transmission mediums. Such content is referred to herein as a sender-controlled contact media content item ("SCCMC") or, in some cases as a "Ving" or a "Vyng."

Provided herein are methods and systems for providing a sender-controlled contact media content data structure that is adapted to be created using a mobile device of a sender and sent to at least one mobile device of at least one recipient; and a host computing system including at least one server for managing the sender-controlled contact media content data structure; wherein the sender-controlled contact media data structure is adapted to be displayed via the contacts function of the mobile device of a recipient under control of the sender of the sender-controlled contact media content data structure.

Methods and systems are provided herein, including methods and systems that include a sender-controlled contact media content data structure that is adapted to be created using a mobile device of a sender and sent to at least one mobile device of at least one recipient; and a host computing system including at least one server for managing the sender-controlled contact media content data structure; wherein the sender-controlled contact media data structure is adapted to be displayed on a screen of a recipient's mobile device when the recipient's device is turned on and able to receive at least one of a data signal and a voice signal, wherein the sender-controlled contact media data structure displays content that is under control of the sender of the sender-controlled contact media content data structure.

In embodiments the sender-controlled contact media content data structure uses voice layer and data layer transmission mediums in a single broadcast act by the sender. In embodiments the screen of the recipient's mobile device is the screen displays upon the occurrence of a contact event at the recipient's mobile device. In embodiments the screen of the recipient's mobile device is the lock screen of the recipient's mobile device. In embodiments the screen of the recipient's mobile device is the home screen of the recipient's mobile device. In embodiments the screen of the recipient's mobile device is an active screen of the recipient's mobile device that displays when the mobile device is unlocked. In embodiments the screen of the recipient's mobile device is a screen that displays while the recipient is on a phone call using the recipient's mobile device.

The methods and systems disclosed herein may include an installable application running on the host computing system for establishing a data connection between the mobile device of the sender and the at least one mobile device of the at least one recipient. In embodiments the installable application is configured to allow discovery of peer devices in proximity to allow an exchange of the sender-controlled contact media content data structure between the mobile device of the sender and the at least one mobile device of the at least one recipient. In embodiments the installable application enables a user interface that allows creation of the sender-controlled contact media content data structure on the mobile device of the sender.

In embodiments the host computing system enables downloading of the sender-controlled contact media content data structure on the at least one mobile device of the at least one recipient.

In embodiments the mobile device of the sender and the at least one mobile device of the at least one recipient are communicatively coupled to the server, and wherein the server is a content server. In embodiments the mobile device of the sender is communicatively coupled to mobile devices of a plurality of recipients, such that each of the recipient devices receives the sender-controlled contact media content data structure. In some cases this is described as a "bomb," a "Vyng bomb," or the like.

In embodiments a plurality of sender-controlled contact media data structures are organized into a channel, such that at least one recipient's mobile device plays a series of the sender-controlled contact media data structures upon a plurality of contact events from at least one sender. In embodiments the channel is associated with at least one of a topic of interest to a sender, a topic of interest to at least one recipient and a social graph of at least one of a sender and at least one recipient. In embodiments the sender-controlled contact media data structures are selected by the sender from a curated library of sender-controlled contact media data structures. In embodiments the library is curated by an algorithm based on a topic of interest indicated by at least one of the sender and the recipient. In embodiments the library is curated by an editor based on the subject matter of the channel.

The methods and systems described herein may include methods and systems for taking a sender-controlled contact media content data structure that is created using a mobile device of a sender; providing a host system that enables transmission of the sender-controlled contact media content data structure from the mobile device of the sender to at least one mobile device of at least one recipient; and causing the display of the sender-controlled contact media content data structure on a screen of the at least one mobile device of the at least one recipient when the at least one recipient's device is turned on and able to receive at least one of a data signal and a voice signal, wherein the sender-controlled contact media data structure displays content that is under control of the sender of the sender-controlled contact media content data structure. In embodiments the sender-controlled contact media content data structure uses voice layer and data layer transmission mediums in a single broadcast act by the sender. In embodiments the screen of the recipient's mobile device is the screen displays upon the occurrence of a contact event at the recipient's mobile device. In embodiments the screen of the recipient's mobile device is the lock screen of the recipient's mobile device. In embodiments the screen of the recipient's mobile device is the home screen of the recipient's mobile device. In embodiments the screen of the recipient's mobile device is an active screen of the recipient's mobile device that displays when the mobile device is unlocked. In embodiments the screen of the recipient's mobile device is a screen that displays while the recipient is on a phone call using the recipient's mobile device. In embodiments the sender-controlled contact media content data structure comprises one or more of audio, video, contact data, and metadata. In embodiments sending the sender-controlled contact media content data structure comprises sending a text message, wherein the text message includes an embedded link to facilitate installation of an application by the at least one recipient on the at least one mobile device of the at least one recipient upon tapping of the embedded link by the at least one recipient, wherein the installable application establishes a data connection between the mobile phone of the sender and the mobile phone of the at least one recipient.

In embodiments the methods and systems described herein may further include downloading of the sender-controlled contact media content data structure on the at least one mobile device of the at least one recipient using the embedded link, wherein the downloading of the sender-controlled contact media content data structure enables displaying a contact of the sender as being associated with the sender-controlled contact media content data structure on the at least one mobile device of the at least one recipient.

In embodiments the methods and systems described herein may further include initiating a contact by the mobile device of the sender with the at least one mobile device of the at least one recipient such that the sender-controlled contact media content data structure is displayed on the at least one mobile device of the at least one recipient when the contact between the mobile device of the sender and the at least one mobile device of the at least one recipient initiates. In embodiments the contact is initiated between the mobile device of the sender and the at least one mobile device of the at least one recipient when the sender places a phone call. In embodiments the contact is initiated between the mobile device of the sender and the at least one mobile device of the at least one recipient when the sender sends a text message to the at least one mobile device of the at least one recipient.

In embodiments the methods and systems described herein may further include enabling a user interface on the mobile device of the sender to allow creation of the sender-controlled contact media content data structure through the user interface. In embodiments the user interface further allows to edit the sender-controlled contact media content data structure from an external source that stores the sender-controlled contact media content data structure. In embodiments the external source comprises one of a cloud repository and a library of a third party content provider. In embodiments the user interface allows to create the sender-controlled contact media content data structure associated with an emotional state of the sender. In embodiments the emotional state is indicated through a data field in metadata associated with the sender-controlled contact media content data structure. In embodiments the emotional state is indicated by one or more of a facial expression, an image, a sound, and an emoticon.

In embodiments the methods and systems described herein may further include setting a privacy control through the installable application to limit publication of the sender-controlled contact media content data structure to a select audience.

The methods and systems disclosed herein may include methods and systems for segregating the created sender-controlled contact media content data structure into one or more of audio, video, and metadata components; associating each of the components of the created sender-controlled contact media content data structure with a particular tone; and storing the tone for each of the components locally on the mobile device of the sender. In embodiments the methods and systems described herein may further include uploading the tone for each of the components on an application server or a content server. In embodiments the methods and systems described herein may further include allowing previewing the sender-controlled contact media content data structure; and adding custom details to the sender-controlled contact media content data structure, either before or after sending the sender-controlled contact media content data structure to the at least one recipient. In embodiments causing the display of the sender-controlled contact media content data structure on the screen of the at least one mobile device is triggered by detection of the passing of the recipient's mobile device into an area defined by a geofence.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the systems and methods disclosed herein.

FIGS. 3A-3G illustrate the creation of an SCCMC in accordance with an embodiment of the systems and methods disclosed herein.

FIGS. 4A-4F illustrate examples of an SCCMC in accordance with an embodiment of the systems and methods disclosed herein.

Figure 1:
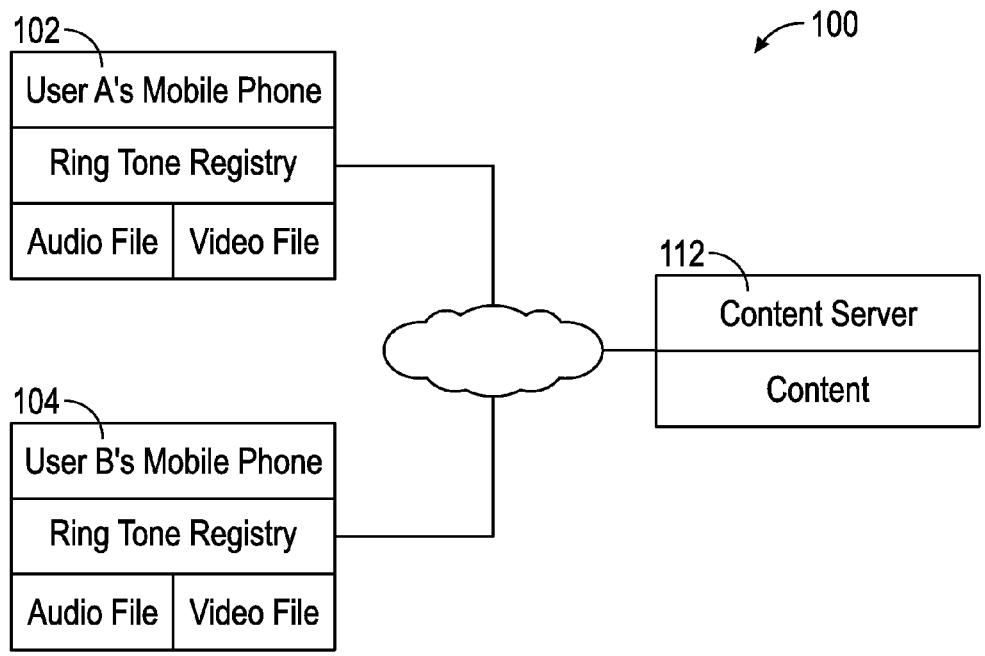
FIG. 1 illustrates an architecture for a method and system for an SCCMC in accordance with an embodiment of the systems and methods disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the systems and methods disclosed herein.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art. The claims should be consulted to ascertain the true scope of the disclosure.

Before describing in detail embodiments that are in accordance with the systems and methods disclosed herein, it should be observed that the embodiments reside primarily in combinations of method steps and/or system components related to enabling a user to associate a service with a product in a way that makes it much more convenient and effective for the user to take advantage of the benefits of the service in connection with the product. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those of ordinary skill in the art.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

As used herein, the term "tone" may be used to refer to a single instance of a sender-controlled contact media content type, which may include one or more of audio, video (which may include video captured by video cameras, voice, computer-generated video, animations, or other video-type content that can be displayed in any format on a mobile device, such as a mobile phone), contact data, and/or metadata. A single tone may be adapted for broadcast, in a single act by a sender, over both voice layer and data layer transmission mediums in a coordinated fashion. As noted above, an SCCMC is also referred to herein (including in the figures) for convenience as a "Vyng," which is an example of a brand name for the SCCMC that would be understood by users to refer to this novel type of content item.

FIG. 1 illustrates an embodiment of an architecture 100 for an SCCMC. The architecture 100 includes a user A's mobile phone 102, referred to alternatively herein as a sender mobile phone 102. The architecture 100 further includes a user B's mobile phone 104, alternatively referred to as a recipient mobile phone 104. The sender mobile phone 102 and recipient mobile phone 104 are each communicatively connected with a content server 112. The architecture 100 may run an application (referred to herein in some cases as the App) that may establish a data connection, or tunnel, between the two user's phones and that may control creation and display of SCCMC-type content between the two devices 102 and 104. The architecture 100 and the SCCMC-type content data structure may be used with any type of mobile device or mobile device operating system or platform, such as the Android™ operating system, the IoS™ operating system, or other operating systems. Embodiments provided herein that describe a particular operating system should be understood to apply to other operating systems, except where context indicates otherwise (such as where a particular operating system lacks the functions described in connection with a particular embodiment). In addition to using and integrating with mobile operating system platforms, the architecture 100 and SCCMC-type content items can be integrated with and layered within other applications, including ones that host developer platforms, such as Facebook Messenger™ and Viber™. Integration with apps that have calling features, including ones that use Voice over IP allows for the SCCMC-type content item to leverage the platforms that support such applications, including to produce SCCMC-type content items to be delivered upon incoming calls. This may be accomplished, among other things, by use of the developer platform resources that are associated with such applications, such as developer user interfaces, application programming interfaces, developer tools, and the like, including integration of the content server 112 described in connection with the architecture 100.

Figure 2A:
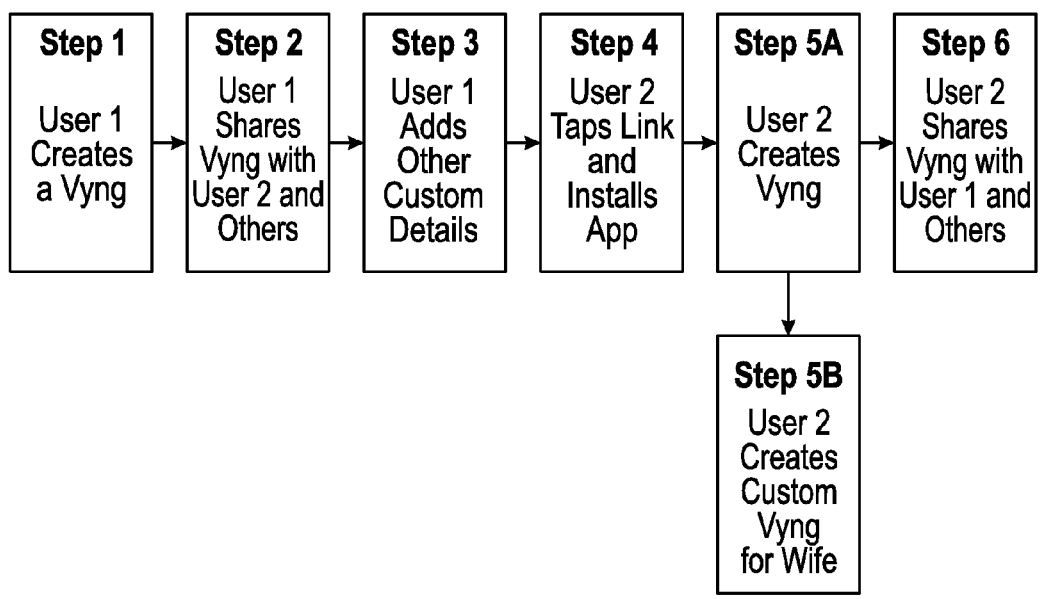
FIGS. 2A and 2B illustrate a process for creating and sharing an SCCMC in accordance with an embodiment of the systems and methods disclosed herein.

FIG. 2A illustrates a process for creating and sharing an SCCMC tone (referred to in some cases simply as a "tone"). First, the architecture 100 may enable a user interface on the sender mobile phone 102 to allow the sender to create video and/or audio content, or an SCCMC tone, at step 1. The user can edit the audio and/or video content from external sources (e.g., stored in the cloud or from a library of a third party content provider), internal sources (e.g., from saved audio/video on the phone), or may create new video/audio. The user may set privacy controls via the App to limit publication of the SCCMC tone to a select audience.

The user's composite creation may be separated into audio, video, and metadata components. These components may be associated with a particular tone, such as by being assigned as properties of the tone. The tone may then be stored locally on the device 102. The tone may be uploaded to the application server or content server 112 and may be persisted in storage, such as associated with the server 112 or in cloud-based storage.

In an exemplary embodiment, a first user may create the SCCMC such as using the App at step 1. At a step 2, the first user may then share the SCCMC with friends, such as by text/SMS message (such as in a snippet, link, or the like in a text) such as with a second user. At a step 3, the first user may preview the SCCMC and/or add other custom details, either before or after sharing the SCCMC with one or more other users. At a step 4, the second user may tap the link and install the App, which may set the SCCMC of the first user on the second user's phone 104. Either user may send the SCCMC to multiple persons, and a community around the App may be used, such as within a group of friends, within a school district, within a work group or enterprise, or the like. When the second user first downloads the App, the first user's contact may be shown now associated with the SCCMC tone created by the first user. The second user may further create a tone at a step 5A. At a step 6, the second user may share this SCCMC with the first user and/or other friends, for example. The second user may, for example, create a custom SCCMC for his wife at a step 5B.

Figure 2B:
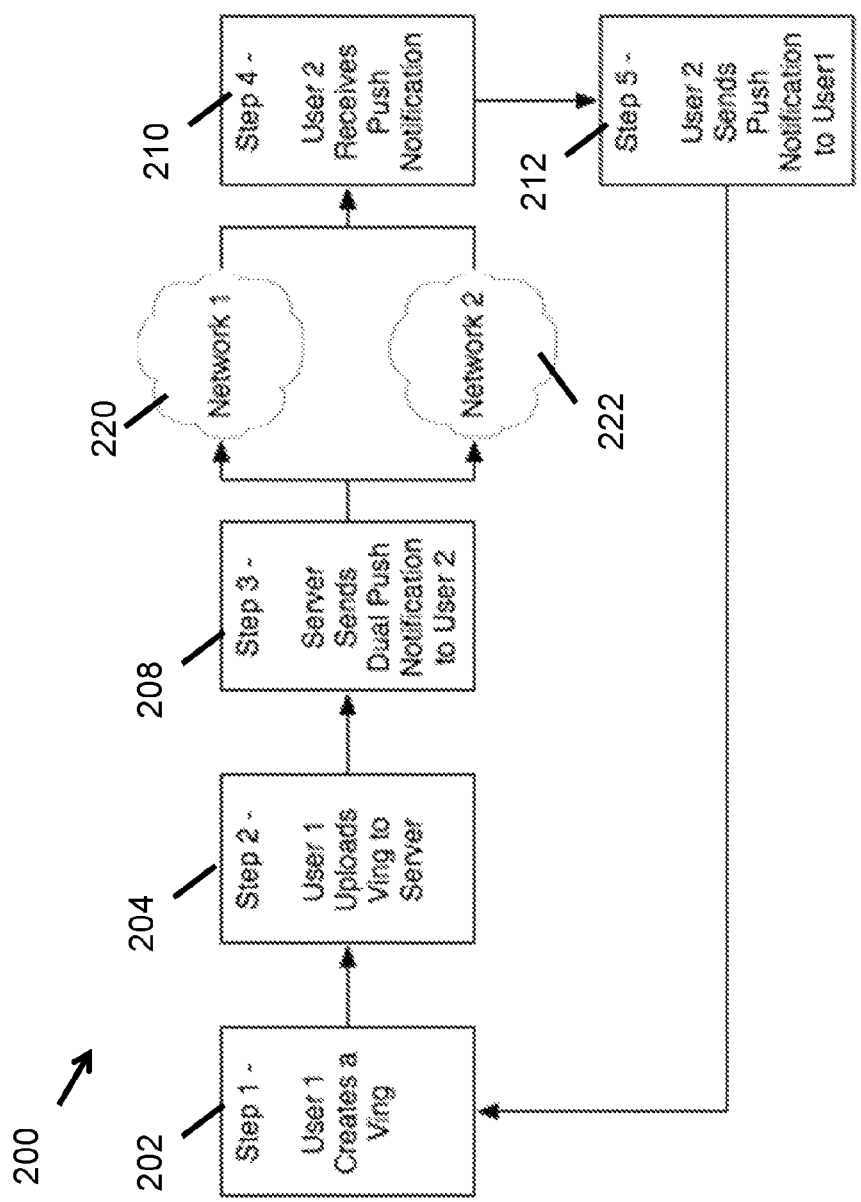

FIG. 2B illustrates a process 200 for creating and sharing an SCCMC tone (referred to in some cases simply as a "tone" or in other cases as a "Ving" or a "Vyng"). First, the architecture 100 may enable a user interface on the sender mobile phone 102 to allow the sender to create video and/or audio content, or an SCCMC tone, at step 202. The user can edit the audio and/or video content from external sources (e.g., stored in the cloud or from a library of a third party content provider), internal sources (e.g., from saved audio/video on the phone), or may create new video/audio. The user may set privacy controls via the App to limit publication of the SCCMC tone to a select audience.

The user's composite creation may be separated into audio, video, and metadata components. These components may be associated with a particular tone, such as by being assigned as properties of the tone. The tone may then be stored locally on the device 102. The tone may be uploaded to the application server or content server 112 and may be persisted in storage, such as associated with the server 112 or in cloud-based storage.

In an exemplary embodiment illustrated in FIG. 2B, a first user may create the SCCMC such as using the App at the first step 202. The SCCMC may be created using a standard encoding protocol. Standard encoding protocols may include HTML5, Flash, MP4/H.264, WebM, Ogg, 3GP/MPEG4 and the like. At a second step 204, the first user may upload the SCCMC to a server. The server may be a hosted on a cloud hosting service. Cloud hosting services may include Amazon Web Services (AWS), Microsoft Azure Infrastructure Services, Google Cloud Platform, CenturyLink Cloud (CLC), VMware vCloud Air, IBM SoftLayer, Rackspace and the like.

At a third step 208, a dual push notification may be sent from the server to a second user. The dual push notification may be sent over a first network 220, a second network 222, or a first network 220 and a second network 222. First network 220 and second network 222 may be on separate infrastructures operated by different operators, such as an Amazon™ SMS infrastructure, a Google™ Cloud Messaging infrastructure, a Pushy™ MQTT infrastructure, an infrastructure of a mobile telecommunications operator, and the like. Sending the push notification over multiple, separate infrastructures may increase the reliability of the push notification sent from the first user being received by the second user.

At a fourth step 210, the second user may receive the push notification on the second user's mobile phone 104. The push notification may include information that tells the second user's mobile phone 104 to prepare to play the SCCMC created by the first user. The second user's mobile phone 104 may download the SCCMC. The SCCMC may be installed on the second user's mobile phone 104 to be played on a screen of the second user's mobile phone 104, such as at the lock screen, on the home screen, in an application, or on a screen that displays while the recipient is on a phone call. At a fifth step 212, the second user may send a push notification to the first user. The push notification sent by the second user to the first user may inform the first user that the second user received the SCMCC sent by the first user. The push notification sent by the second user to the first user may also inform the first user that the SCMCC sent by the first user to the second user is ready to play on the second user's mobile phone 104.

Figure 2C:
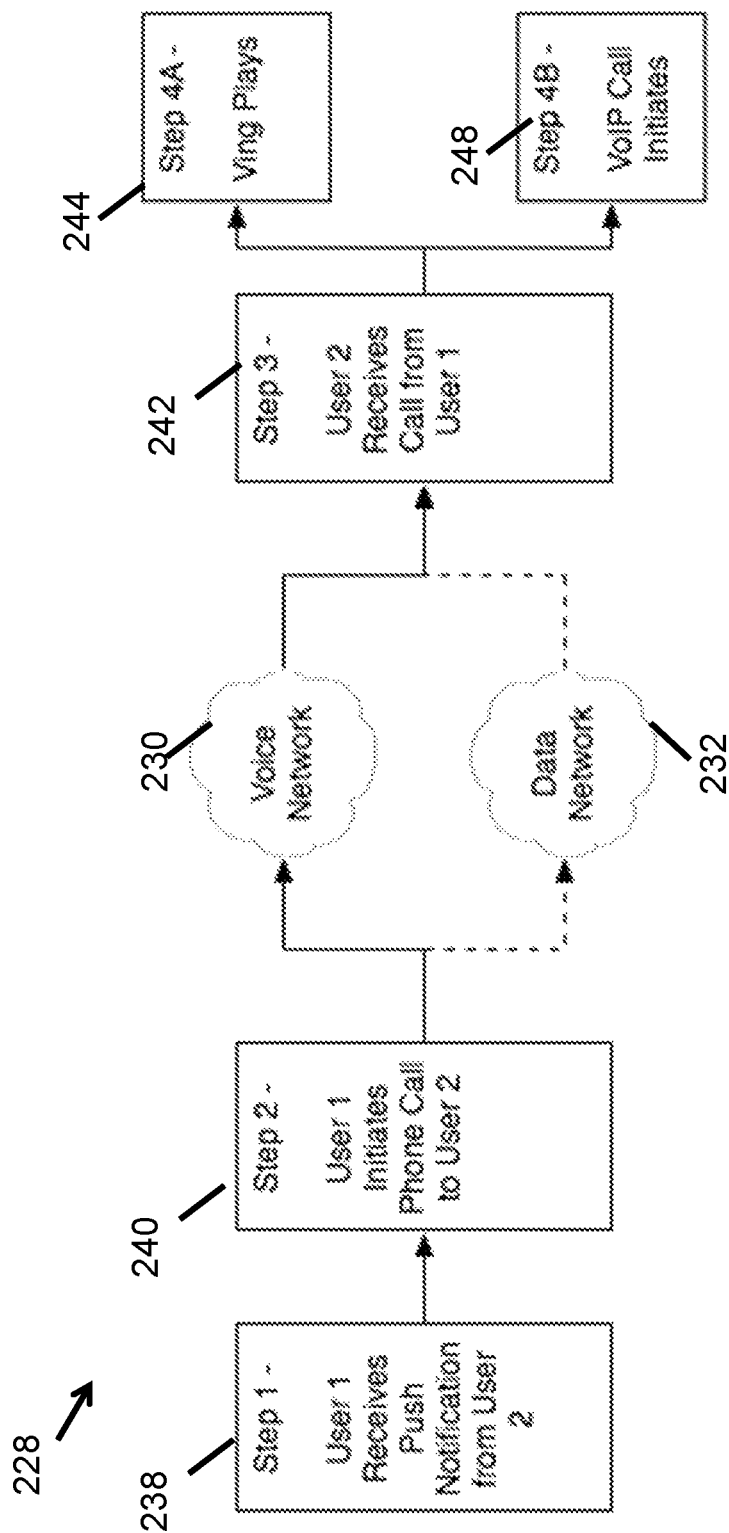
FIG. 2C illustrates a process for initiating a phone call in accordance with an embodiment of the systems and methods disclosed herein.
Figure 3D:
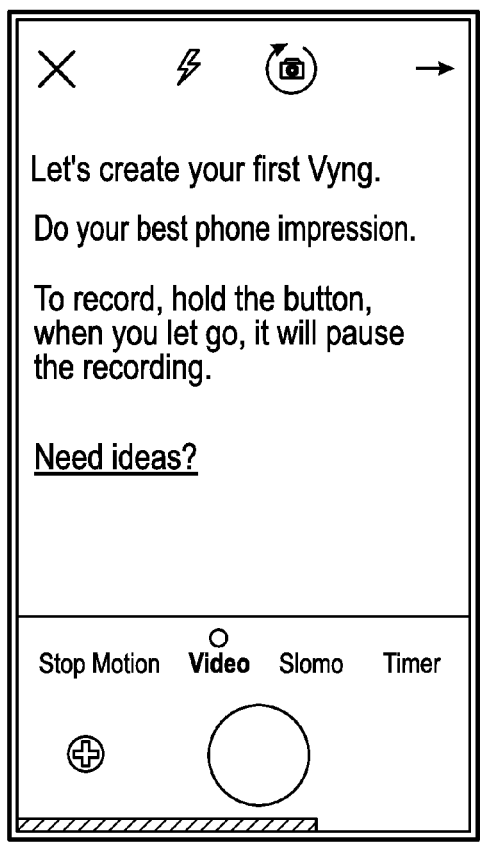
Figure 3E:
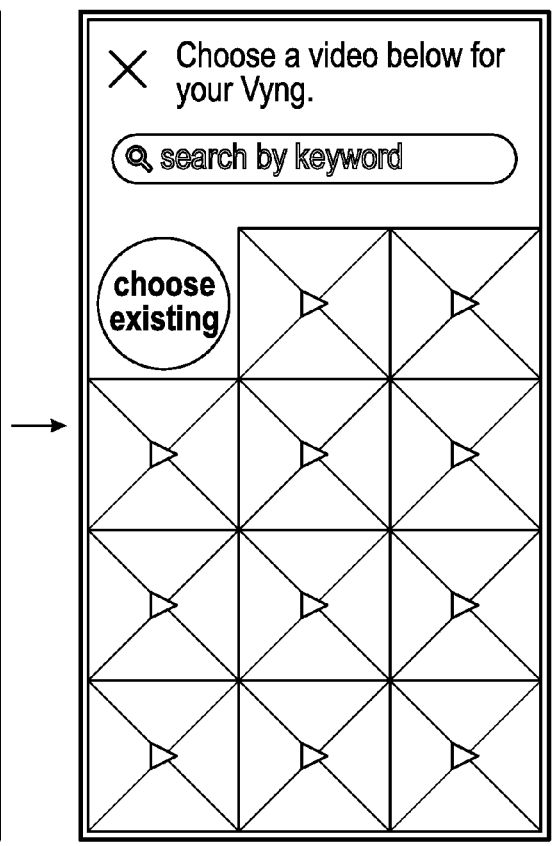
Figure 3F:
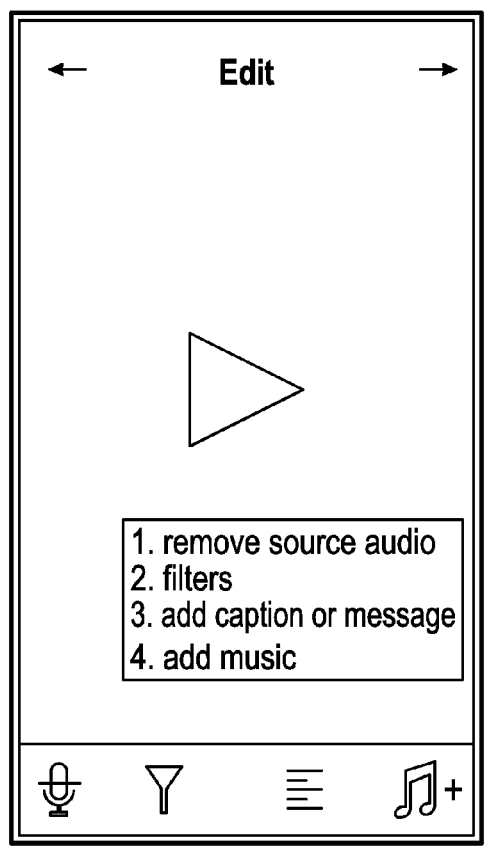
Figure 3G:
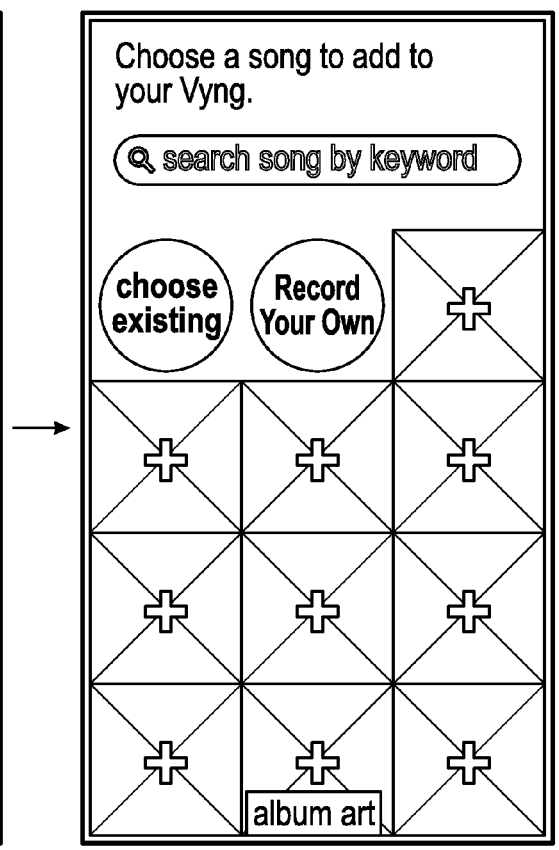

FIG. 2C illustrates a process and flow 228 for initiating a phone call. A phone call may be initiated when a first user receives a push notification from a second user, as illustrated in the first step 238. In a second step 240, the first user may initiate a phone call from the first user's mobile phone 102 to the second user's mobile phone 104. The phone call may be initiated over a voice network 230, a data network 232 or both. In embodiments, the call may use both transmission layers (voice and data). A voice network 230 may be a cellular phone network. A phone call initiated over a data network 232 may be a voice over Internet protocol (VOIP) phone call. A VOIP phone call may be initiated with a second push notification sent from the first user to the second user. A second push notification may include a session ID. A VOIP call may be initiated using a third party service. A third party service may be provided by Top Box, Skype, Google Hangouts, WhatsApp, WeChat and the like.

The second user may receive the phone call on the second user's mobile device 104 from the first user's mobile device 102 at a third step 242. The second user's mobile device 104 may play the SCCMC when the phone call is received from the first user's mobile device 102, as illustrated in subsequent steps 244 and 248.

FIGS. 3A-3G illustrate detailed screenshots of a user interface of the App by which a first user may create a new SCCMC. The first user may create the SCCMC with custom ringtones, text tones, and photo as part of his contact card that may be controlled by the first user himself on his friend's phone (recipient mobile phone 104) instantly. The App may provide interfaces for getting started with the App, brief tutorials, the capability for recording videos, the ability to select friends, the ability to push videos to other people's phones, and the like. Ideas may be provided as prompts to the user. The App may allow creating and sharing of videos and tunes. The App may allow listening to or viewing other ringtones that have already been created. The App may allow creating the first SCCMC for a user. The App may also allow various video options, such as slow motion, the use of a timer, and the like, to be included in or with the SCCMC.

The App may allow the user to edit a page and/or request additional tools or advanced features. In an example, the source file may be removed and the App may keep the video and play something else for audio and/or split the video and audio and change either one. The App may allow adding filters, captions, messages, or music, customization of the message, and the like. The App may allow sharing a page to a list of friends and the like. The App may allow sharing through a text message, such as via a button that allows the user to send a preview of the SCCMC with video and/or audio and a link to download the App. The App may enable a store for downloading the App if it is not already installed on the phone of the recipient. If the second user has an App, a message may trigger delivering the SCCMC tone to a queue.

For purposes of creation, a button in the App may allow the first user to discover and choose audio, videos or SCCMC tones that he may already have. The videos or other forms of content to be used in the SCCMC may be stored in a library, and the App may facilitate discovery from the library. The App may also allow browsing other videos that come from other websites that enable sharing or downloading of video. In embodiments the SCCMC may be selected from a curated library of SCCMC-type content. The library may be automatically curated, under computer control, via an algorithm that is based on a topic of interest indicated by a sender or a recipient of an SCCMC. The library may be curated by an editor based on subject matter, such as the subject matter of a channel to which a sender or recipient subscribes.

The App may allow searching for key words, and it may automatically upload a video that is searched for those keywords. The App may also allow using stop-motion photos in the SCCMC and may allow video or audio payload. The App may allow adding audio to videos, and the like. The audio files may be either taken from what is already created (user's library), or from the sender mobile phone 102, or from other users, albums (such as music store), and the like.

Figure 4A:
Figure 4B:
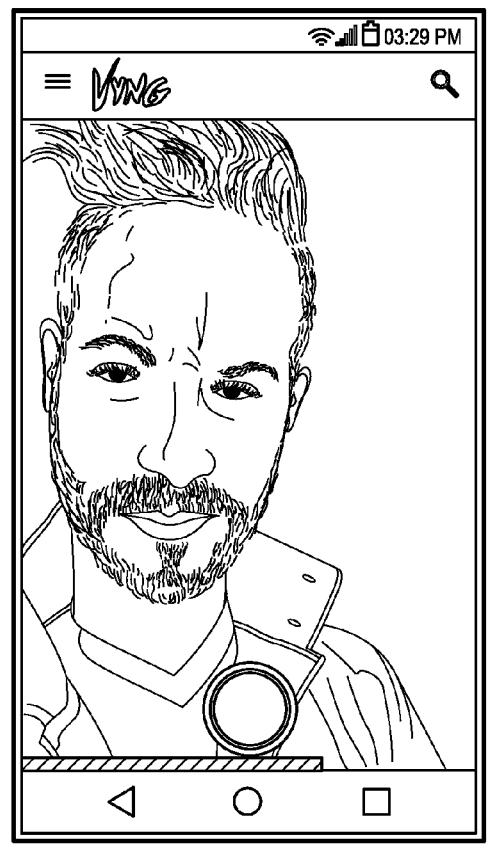
Figure 4C:
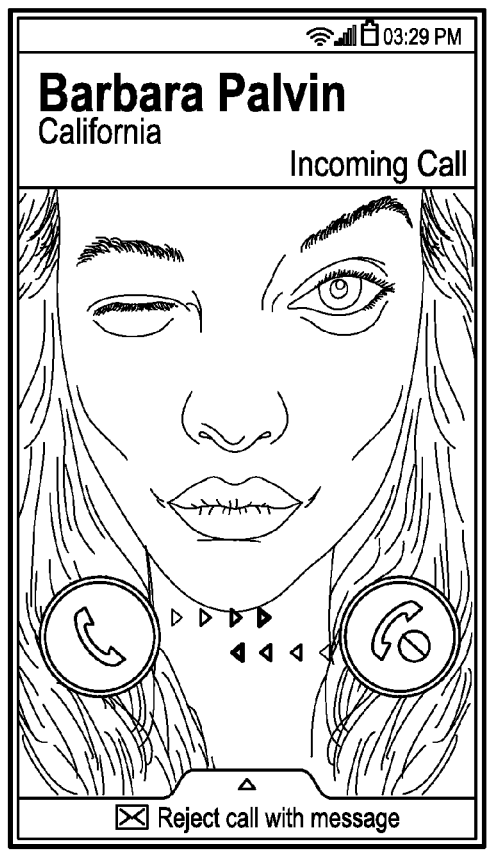
Figure 4D:
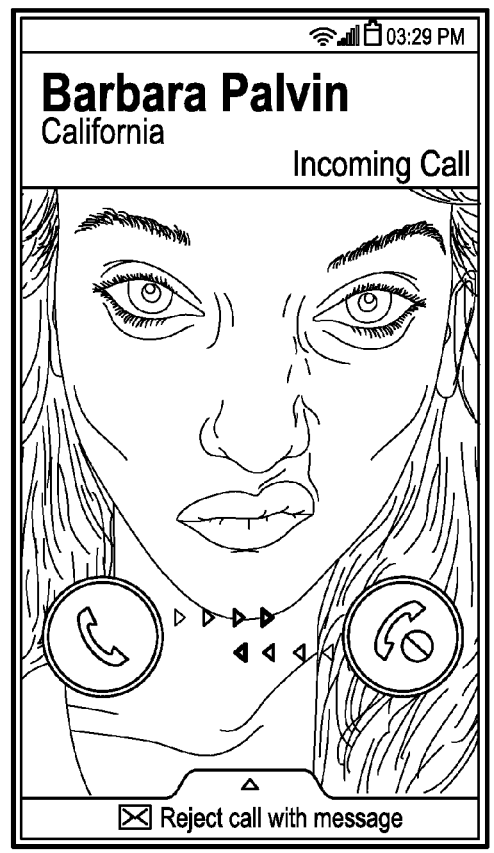

FIGS. 4A and 4B illustrate a call being received on a second user's mobile device 104. The call may display the SCCMC tone created by the first user automatically on the second user's phone. In embodiments the first user may wish to convey a current emotional state. A user interface on the first user's phone may, for example, allow the first user to create multiple tones, each of which is associated with an emotional state. The emotional states may be indicated in metadata of the tones. When the user initiates a call, the user may indicate a current emotional state, which, when transmitted to the phone of the second user, may initiate a process by which the App selects and displays the correct SCCMC tone that is associated with that current emotional state of the first user. The emotional state may be conveyed by a facial expression, an image, a sound, an emoticon, or other characteristic associated with a particular tone.

As shown, the recipient mobile phone 104 may display the SCCMC that the first user directs the recipient mobile phone 104 to ring/show video that reflects current mood of the first user. The App may be able to choose what the first user sends, or what is displayed on the second user's phone, such as indicated by emojis, by selecting a mood, or the like. In embodiments the correct SCCMC tone may be shared every time the first user calls or texts the second user. In other embodiments one or more tones is stored on the second user's mobile device 104 and is triggered by the receipt of a call from the number of the first user's device 102, possibly carrying with it other information (which may be transmitted over the server 112 via the App) that allows selection of particular emotional content. [In embodiments the App may change an SCCMC during a call. The App may be triggered to change an SCCMC during a call when the mood of the first user changes to a different mood, for example. The App may select a new SCCMC for display on the second user's device 104 to reflect the different mood of the first user.] A user may be able to respond to the SCCMC.

A user may be able to respond to an SCCMC by tapping on the SCCMC. For example, a second user may be able provide feedback to a first user on an SCCMC sent by the first user to the second user. The feedback sent by the second user may indicate the second user's satisfaction with the SCCMC sent by the first user to the second user. The second user may provide feedback to the first user by tapping on an SCCMC received from a first user, for example. The tap may generate a heart or other emoji on the SCCMC displayed on the second user's mobile device 104. The tap may also generate a heart or other emoji on the screen of the first user's mobile device 102.]

Figure 5A:
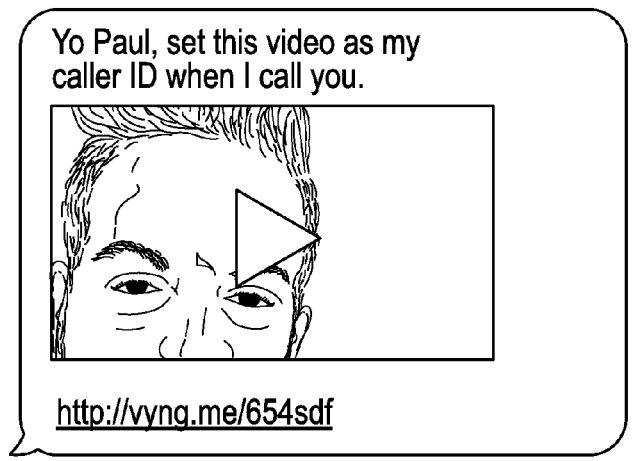
FIGS. 5A-5C illustrate User A sharing an SCCMC with User B in accordance with an embodiment of the systems and methods disclosed herein.
Figure 5B:
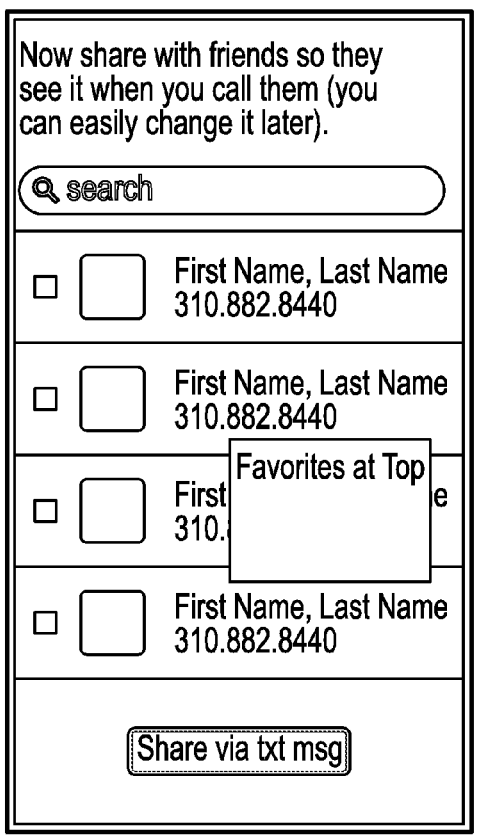
Figure 5C:
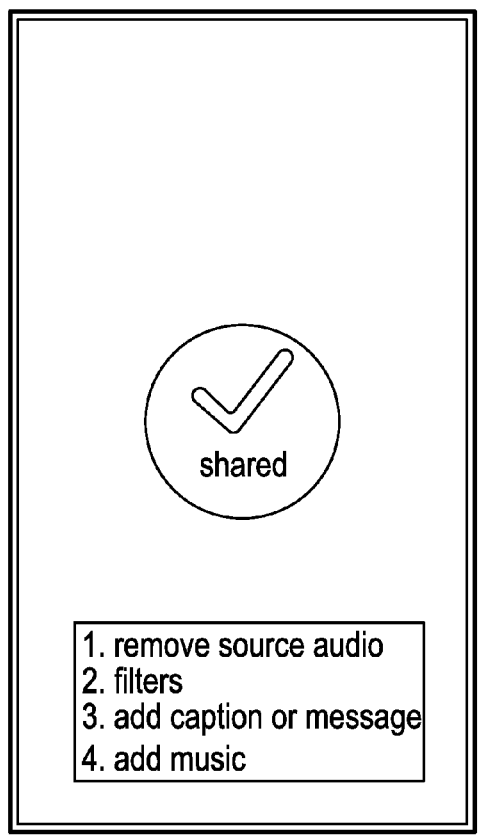

FIGS. 5A-5C illustrate embodiments of user interface features by which the first user may share an SCCMC tone with the second user. FIG. 5A illustrates a message that the second user may receive from the first user, prompting the second user to accept delivery of and set the SCCMC tone of the first user on the mobile device of the second user. The message may include text, video, audio, links, and the like. FIG. 5B illustrates a detailed screenshot of the interface by which a first user may select which friends the first user would like to have receive the particular SCCMC tone. FIG. 5C illustrates a confirmation that may be displayed to the first user when the SCCMC has been successfully shared with the selected friends of first user.

In various embodiments, content delivery may be achieved either through a client-server architecture (including a cloud architecture), a peer-to-peer architecture, or other content delivery architecture.

In a client-server approach, the App may periodically query the application server or content server 112 for newly published or updated content. A content update may also be triggered via a push message from the server 112. Content may be filtered based upon privacy settings set by the content creator. The App may automatically download newly published or updated content and may synchronize the local data store on the device 102 with other content, such as cloud-stored content.

In a peer-to-peer approach, users, such as the first user and the second user in the examples above, who are in proximity to each other or connected via any peer-to-peer network connection may discover each other through the App. For example, the peer application may broadcast its presence to a listening port on the other peer device to establish its presence and seek to exchange credentials. Once discovered, peers may be displayed in the App to a user. The user may then selectively send SCCMC tones to one or more discovered peers.

Figure 6:
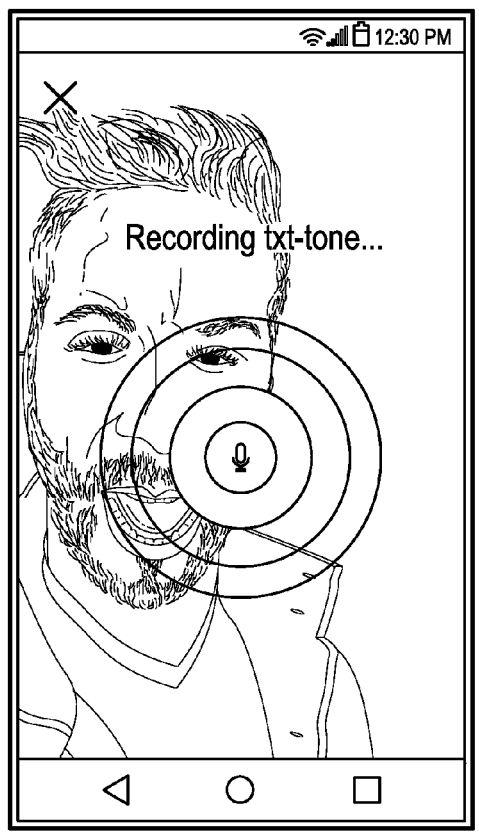
FIG. 6 illustrates User A adding custom details to an SCCMC in accordance with an embodiment of the systems and methods disclosed herein.

FIG. 6 illustrates a detailed screenshot of a user interface by which a user may record audio for inclusion in or with an SCCMC tone.

Figure 7:
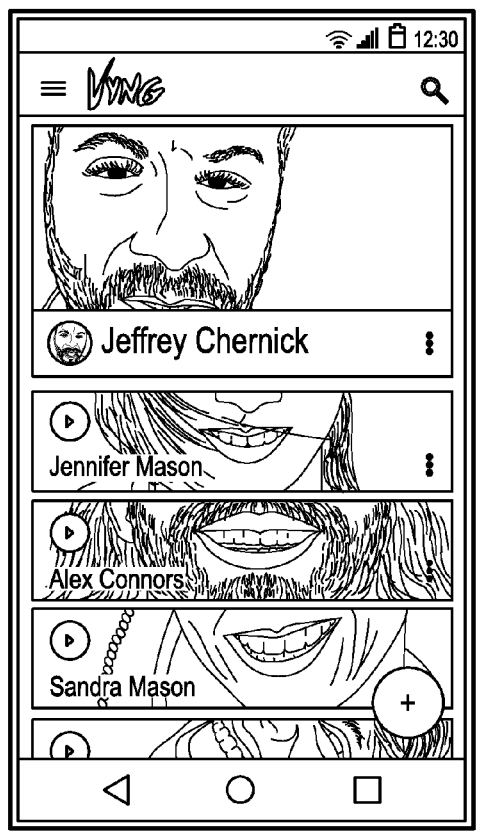
FIG. 7 illustrates User B setting an SCCMC received from User A in accordance with an embodiment of the systems and methods disclosed herein.

FIG. 7 provides a detailed screenshot of an interface by which a user may see snapshots of various SCCMC tones, such as ones received from other users or ones created to be shared with other users. When the App is installed on the phone of a user, the phone number of the user may be verified. Verification may be done in the background, such as when the phone is running the Android operating system. The App then may use the phone number to automatically set any SCCMC tones that are shared with the user by any friends of the user who are listed in the contacts on the phone of the user. The SCCMC tones may be set automatically by seamlessly matching the phone number associated with the SCCMC tone to the phone number of a contact in the address book on the phone of the user. Once the App is installed on the phone of a user, any new SCCMC tones sent to the user may be automatically set and a notification may be displayed in the notification list of the phone. SCCMC tone acceptance by the user may be automatic, may be active and require input from the user, and the like. SCCMC tone acceptance may be controlled by the user in the settings of the phone or of the App.

In embodiments upon initiation of the application on a mobile device 102, 104, the App may register with the operating system of the mobile device, including registering as a listener for incoming voice calls and incoming text messages.

When the App is notified of an incoming call, it may receive the incoming phone number from the operating system. The App may query its own internal database for an SCCMC tone that is linked to the incoming phone number. If a match is found, the App starts a new activity to play the SCCMC tone, such as using the default ringer application on the phone.

When the App is notified of an incoming text message (SMS), it may receive the incoming phone number from the operating system. The App may query its own internal database, such as for audio to play that is linked to the incoming phone number. If a match is found, the App may play the audio file, such as in an alternative to playing the default sound normally used to indicate an incoming text message.

The App may further allow pushing and synchronizing content to the contacts portion of a friend's/contact's phone, such as the recipient mobile phone 104, where the first user may control the video/audio presentation when the recipient mobile phone 104 rings upon the call of the first user. In embodiments a user can find, manipulate and/or create video and/or audio and push it to the contacts function on someone else's phone, such as the recipient mobile 104.

Figure 8:
FIG. 8 illustrates User B creating an SCCMC and sharing the SCCMC with User A and others in accordance with an embodiment of the systems and methods disclosed herein.
Figure 9:
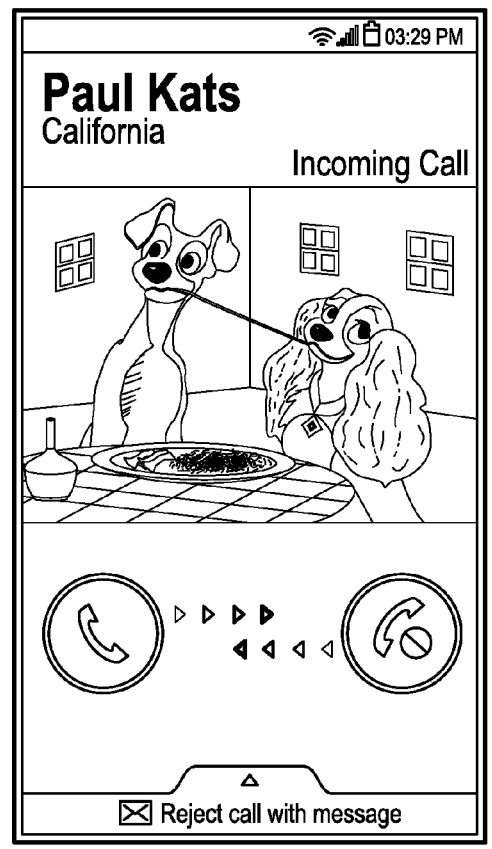
FIG. 9 illustrates an SCCMC created by User B for his wife in accordance with an embodiment of the systems and methods disclosed herein.

FIGS. 8 and 9 illustrate examples of an SCCMC tone being displayed on the mobile phone 104 of the user as the user receives a call from someone who created and sent an SCCMC tone to the user.

Figure 10:
FIG. 10 illustrates a Home-Feed screenshot of an SCCMC in accordance with an embodiment of the systems and methods disclosed herein.

FIG. 10 illustrates a "Home—Feed" interface screenshot. The interface allows a user to see what he or she has downloaded and what he or she has shared with another user. The interface may allow a user to "like" or comment on the SCCMC tone. The interface shows what is pending in the news feeds of the user. The interface may also show updates in the SCCMC tone by other users.

Figure 11A:
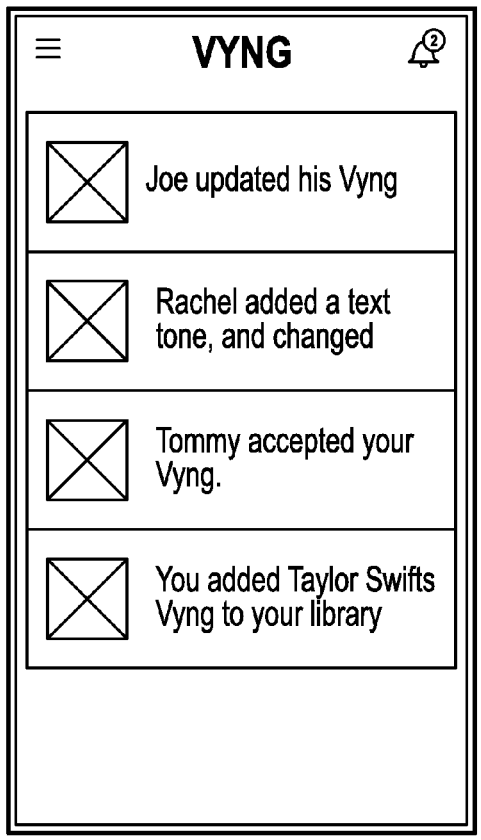
FIGS. 11A-11B illustrate Notifications screenshots of an SCCMC in accordance with an embodiment of the systems and methods disclosed herein.
Figure 11B:
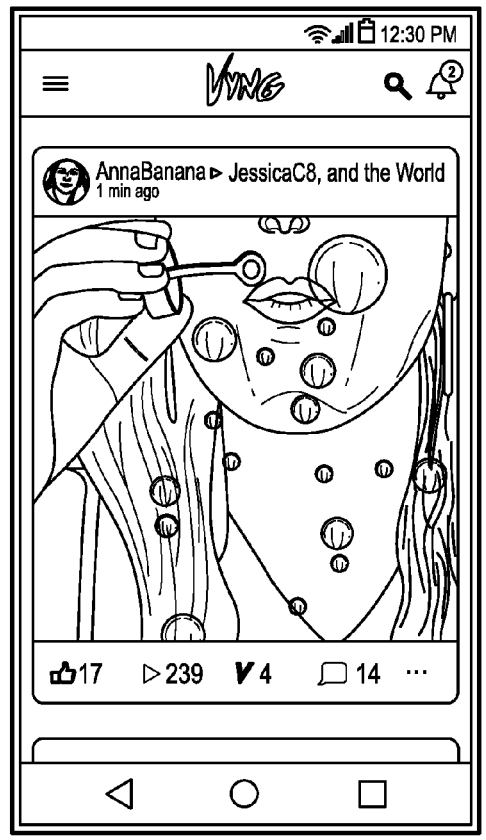

FIGS. 11A-11B illustrate screenshots for displaying notifications. A user may receive notifications via one or more push messages sent through the mobile operating system of the phone of the user. As illustrated in embodiments shown in FIGS. 11A-11B, a user may access notifications via a notification icon 1102 displayed in the App. The App may enable a communication channel between the first user and his or her close contacts, including the second user, so that the first user and his or her friends may have an automatic update channel. For example, as shown in FIG. 11A, Joe may have updated his SCCMC tone and shared the update with a second user over the communication channel. As an example, the first user may change audio and video associated with the SCCMC tone that the first user shared with the second user. The App may reflect changes in the user profile of the first user on the phone of the second user and notify the second user of the changes in the notifications interface of the phone of the second user. The changes may reflect a changed text (e.g., audio) tone, changed SCCMC tone, and the like.

In the illustrated embodiment shown in FIG. 11A, the first user not only created a video ringtone, but also created a text tone. The App changes the text tone accordingly.

Embodiments may include user linking. For example, the first user and the second user may link their accounts so that shared content is available between the users. The first user may send a text message with an identifying token via the App to the second user. The App on the recipient's phone 104 may listen for the incoming text message and automatically send the identifying token to the server 112. The two accounts are then linked server-side so that content may be shared between the first user and the second user.

User discovery may also be enabled. The App may also display a feed of publicly shared tones. The users may discover and link their accounts to other users in the public feed via private request/accept messages. Users may "like" a tone, add a tone to their library (re-Vyng), comment on a tone, report a tone and the like. A record button may be fixed to the bottom of the feed screen. Video may play without audio as a user scrolls through the feed. Users may maximize the video by tapping on it, and when the video is maximized the accompanying audio may be played.

Figure 12:
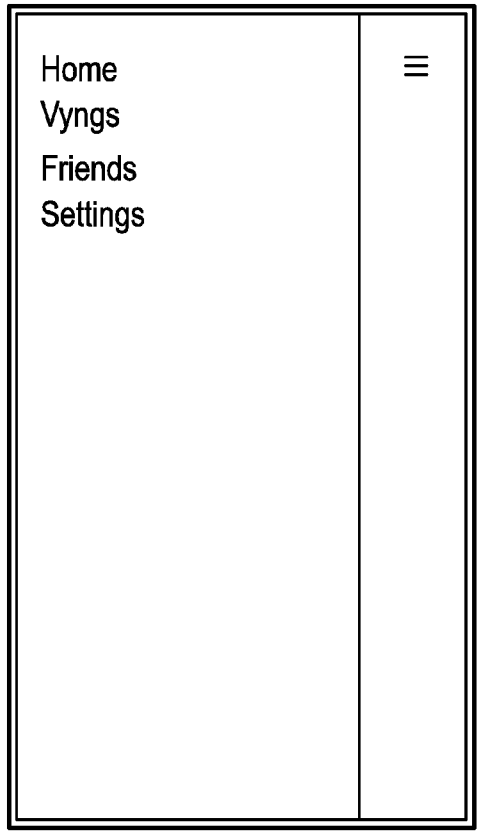
FIG. 12 illustrates a Menu screenshot of an SCCMC in accordance with an embodiment of the systems and methods disclosed herein.

FIG. 12 illustrates a "Menu" screenshot. The user may access a home screen, a list of tones (referred to as "Vyngs" in FIG. 12), a list of the user's friends, and other settings from the "Menu".

Figure 13:
FIG. 13 illustrates a Settings screenshot of an SCCMC in accordance with an embodiment of the systems and methods disclosed herein.

FIG. 13 illustrates a Settings screenshot. Various settings options may be provided to allow the second user to set allowances for his or her contacts e.g., preview tones before they automatically update on the recipient mobile 104.

FIGS. 14A-14I illustrate various screenshots for the process to enable contact editing between the first user and the second user using an SCCMC tone. A channel is provided to enable contact editing between the first user and the second user. The edits made by the first user to the contact provided to the second user may be done automatically or under control of the first user, the second user or the first and second user. A user may allow an SCCMC to be saved, synchronized, or automatically updated.

The first user may go into a payload that the first user sends to the second user. The first user may put content in the form of a profile picture, name, and email into the payload. If the first user changes any of this content, then the second user receives an update (e.g., the first user changed his profile picture, email, etc.) that may automatically update the content on the recipient's phone 104, or the recipient may have settings that control updates to the recipient's phone, such as by allowing the payload to be updated under control or automatically, based on the settings selected by the recipient.

The SCCMC tone created for the first user can be shared with the second user, the world, or other people selected by the first user. The first user may decide to not share the SCCMC tone.

Figure 14A:
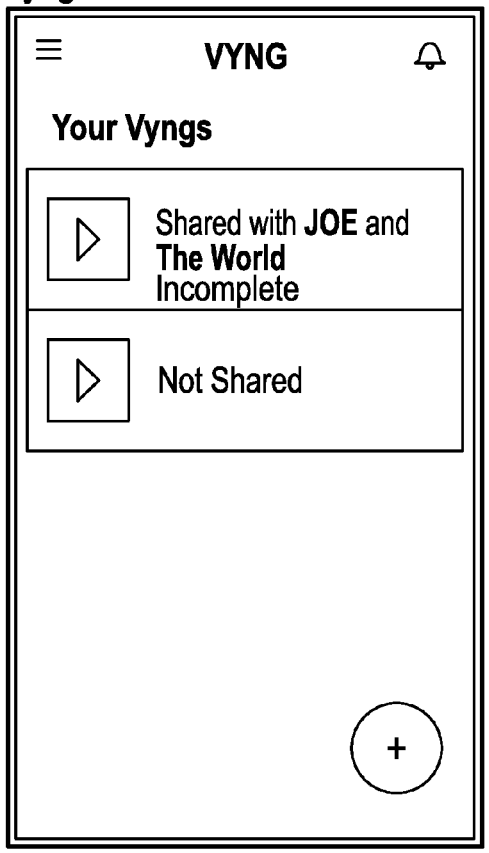
FIGS. 14A-14I illustrate screenshots of a process to enable contact editing between users in accordance with an embodiment of the systems and methods disclosed herein.
Figure 14B:
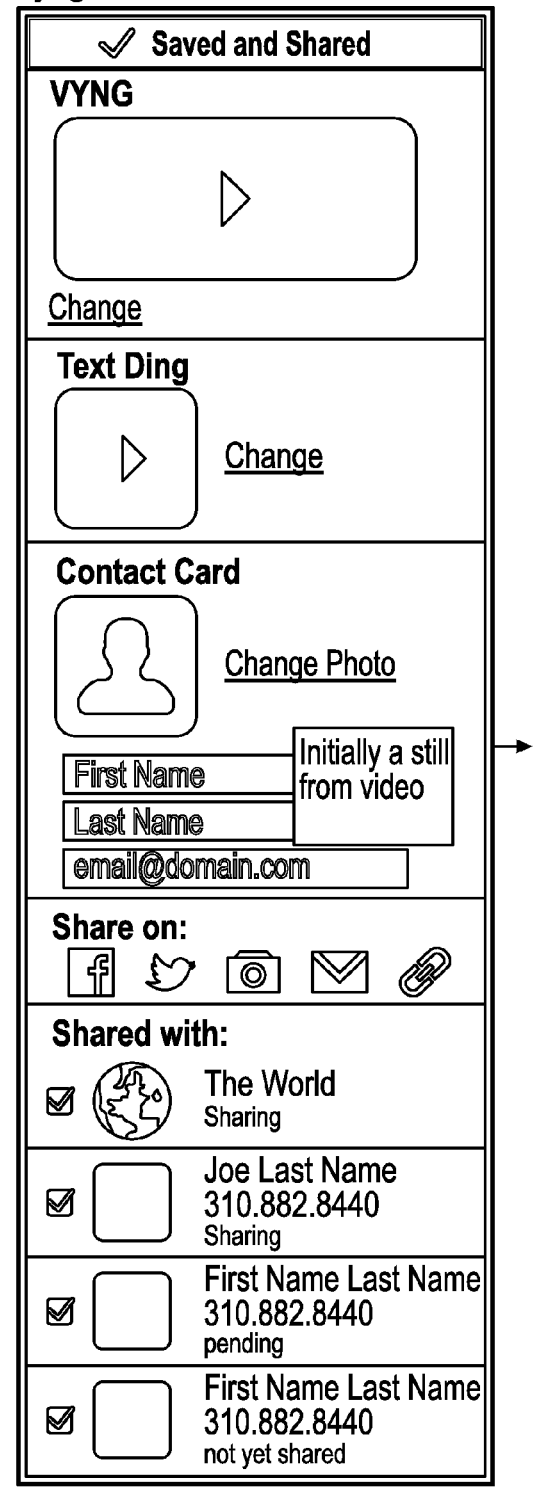
Figure 14C:
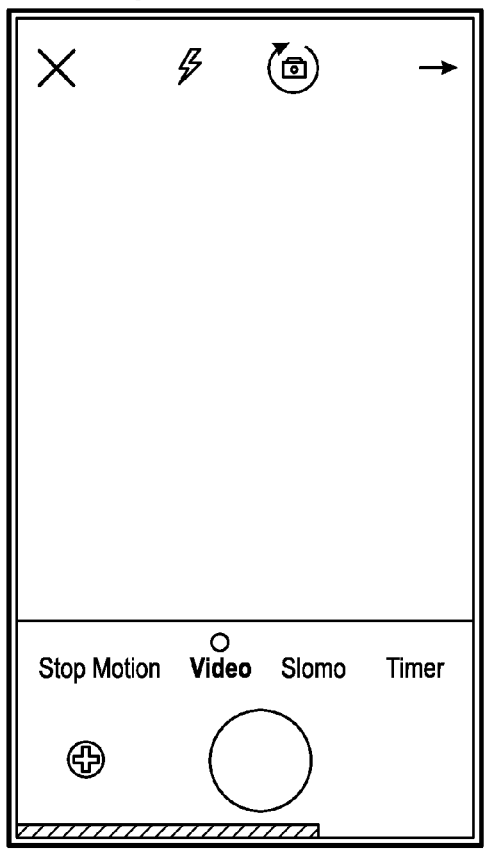
Figure 14D:
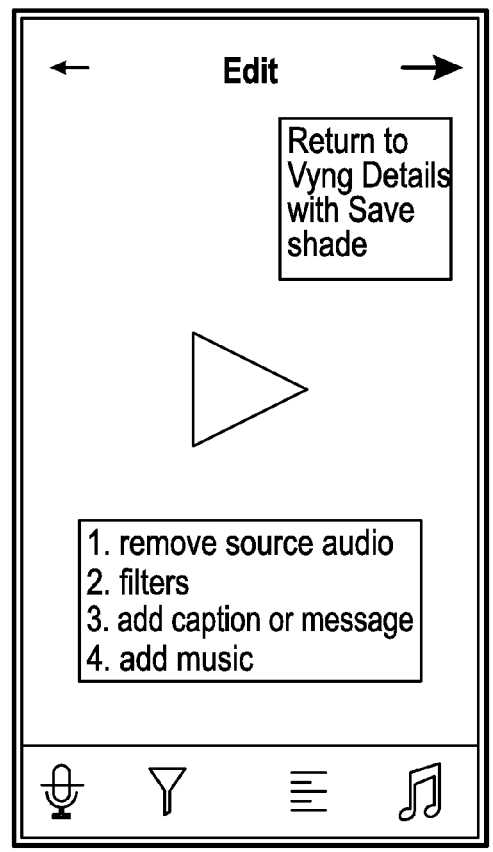
Figure 14E:
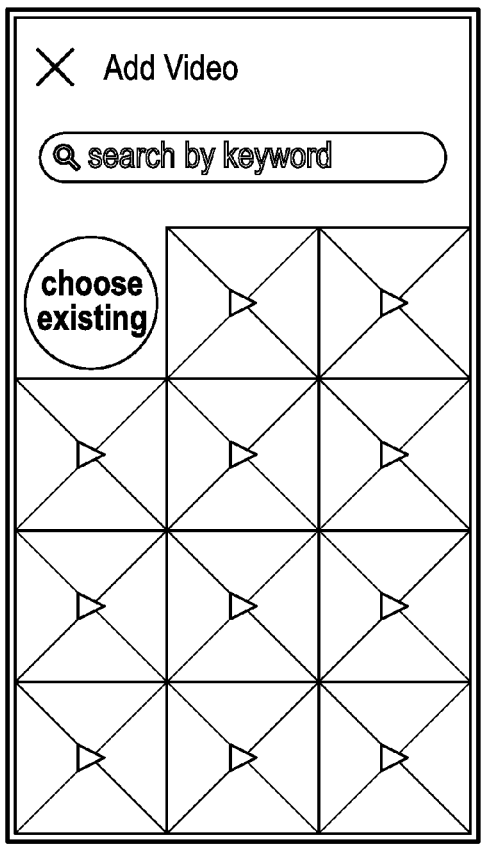
Figure 14F:
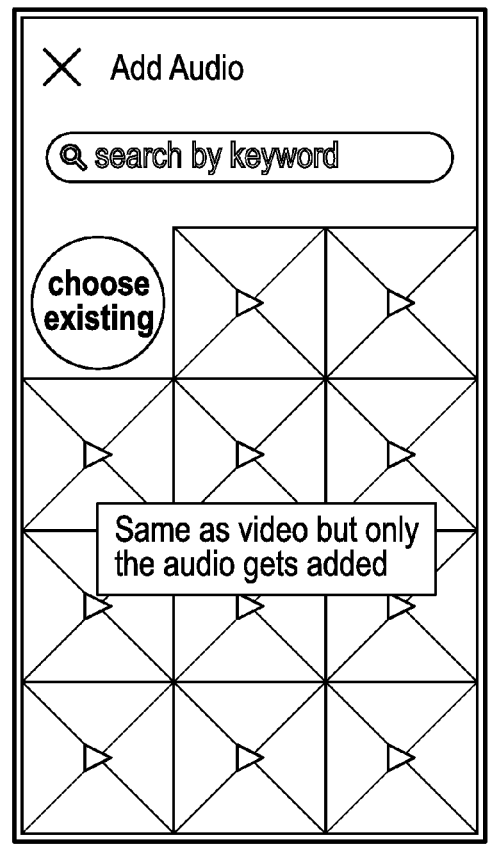
Figure 14G:
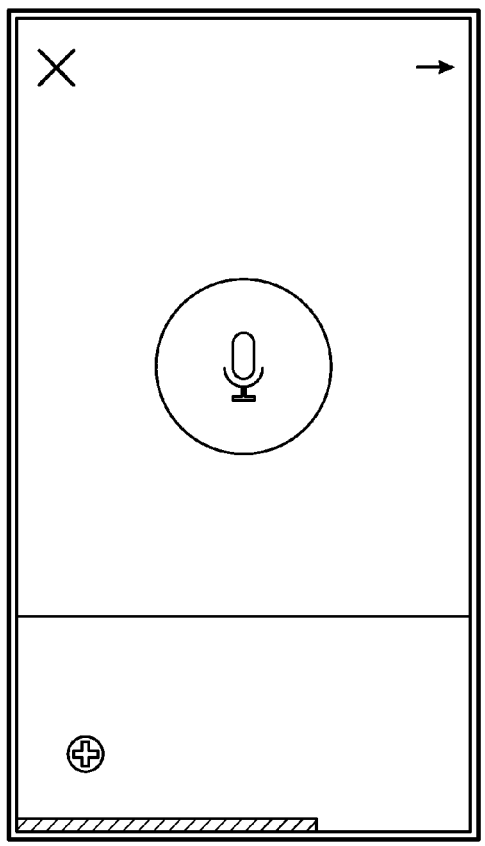
Figure 14H:
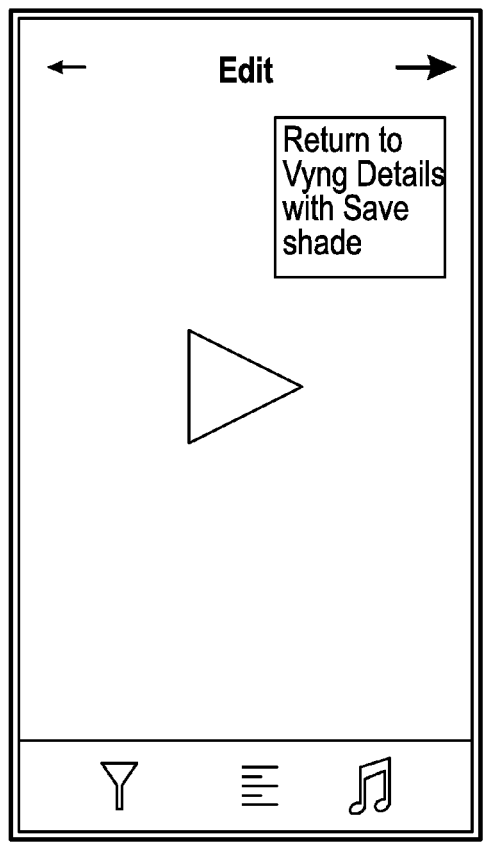
Figure 14I:
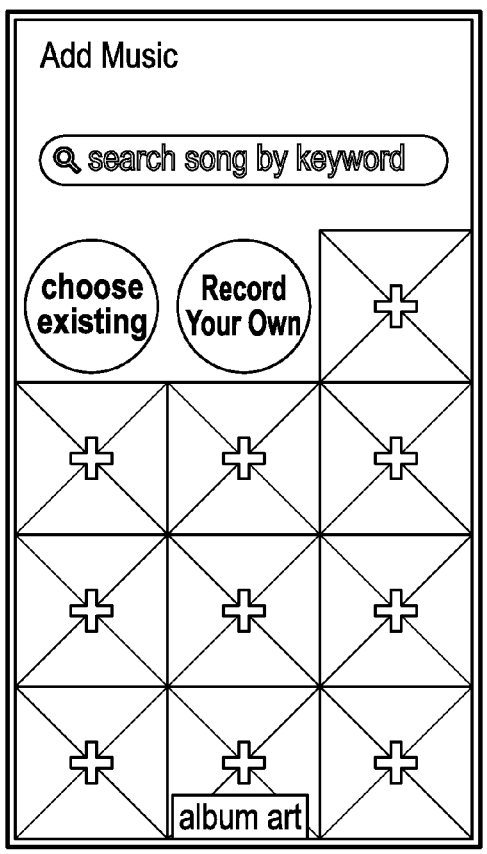

The first user may choose to select existing video or audio to add to the SCCMC tone as shown in FIGS. 14E-14F, newly captured audio as shown in FIGS. 14G-14H, and music as shown in FIG. 14I. Newly captured audio may be captured and posted automatically.

In an example, an SCCMC tone may live on the recipient's phone 104 at the level of the contacts function, rather than in an application that the second user has to locate, access, and use. The contact card may create all the features of the SCCMC tone using content taken from the social network of the first user. If first user calls or texts the second user, the SCCMC displays the contact of the first user, whenever the second user uses the normal functions of the phone 102 to interact with the call or text from the first user. Thus, the SCCMC tone is played within the contacts function of the recipient's phone, without requiring the recipient to interact with an application.

Figure 15A:
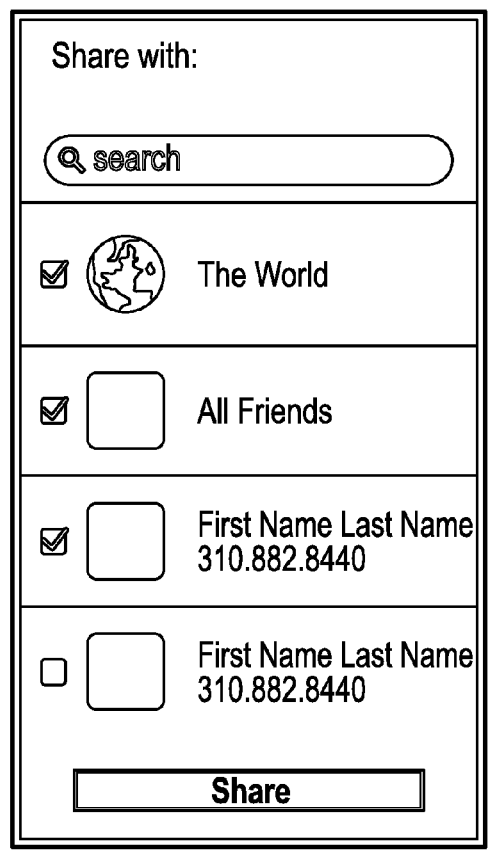
FIGS. 15A-15C illustrate screenshots of a process to deliver a contact with a SCCMC that automatically, or under user control, updates on the phone contacts of another user in accordance with an embodiment of the systems and methods disclosed herein.
Figure 15B:
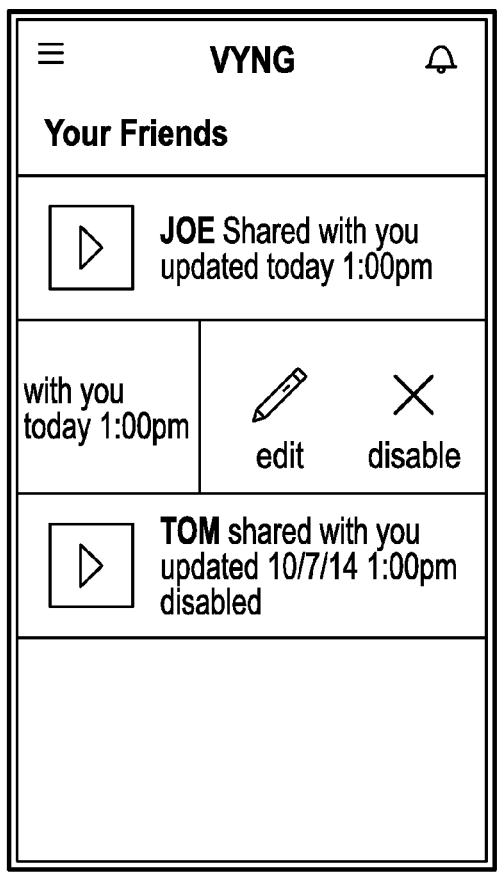
Figure 15C:
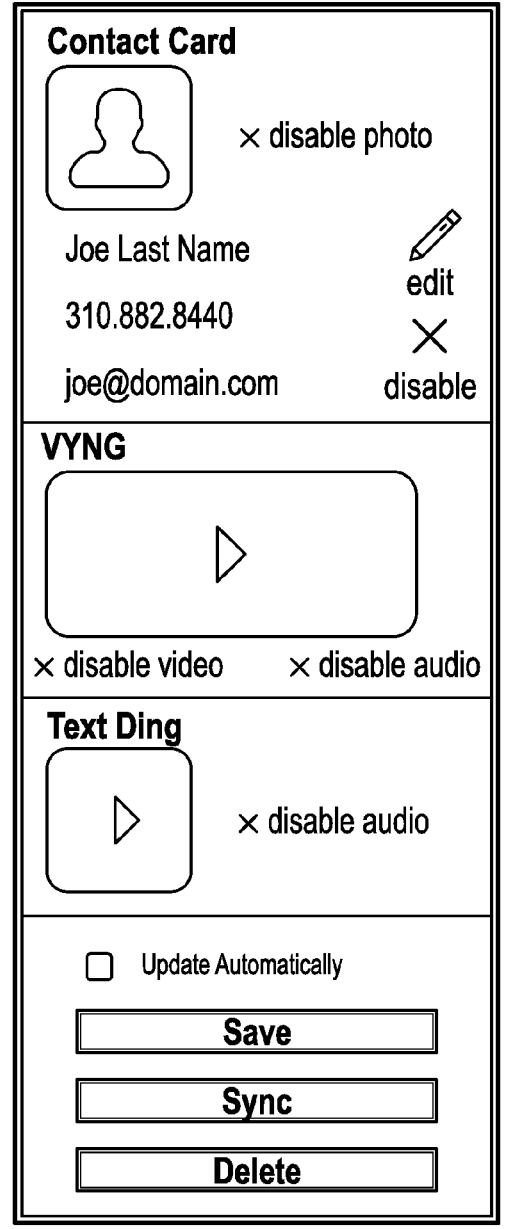

FIGS. 15A-C illustrate screenshots providing the process to deliver a contact with an SCCMC tone that then automatically, or under user control, updates on the phone contacts of another user. FIG. 15A illustrates a screenshot providing an interface that may allow a first user to select with whom first user wishes to share the SCCMC tone. The first user may choose to share the SCCMC tone publicly, for example with the world, with all friends or with selected friends. FIG. 15B illustrates a screenshot providing an interface that may allow a second user who receives the SCCMC from the first user to enable or disable the SCCMC. FIG. 15C illustrates a screenshot providing an interface that may allow second user to edit the SCCMC received from the first user and control the behavior of the SCCMC on the phone of the second user.

Various content control functions may be enabled. When the App receives new or updated SCCMC tone information, the App may update the local store of metadata in the application database and update the local contact information of the registered user with fields stored in the a data record for the SCCMC tone. The App may also convert the ringtone audio portion of the SCCMC tone into an acceptable format for a ringtone or text tone on the local device, save the ringtone to the shared data store in the phone's operating system, and register the ringtone with the operating system. Using application programming interfaces (APIs) of the operating system, the App may assign the ringtone to the sender on the recipient's phone 104.

Figure 16:
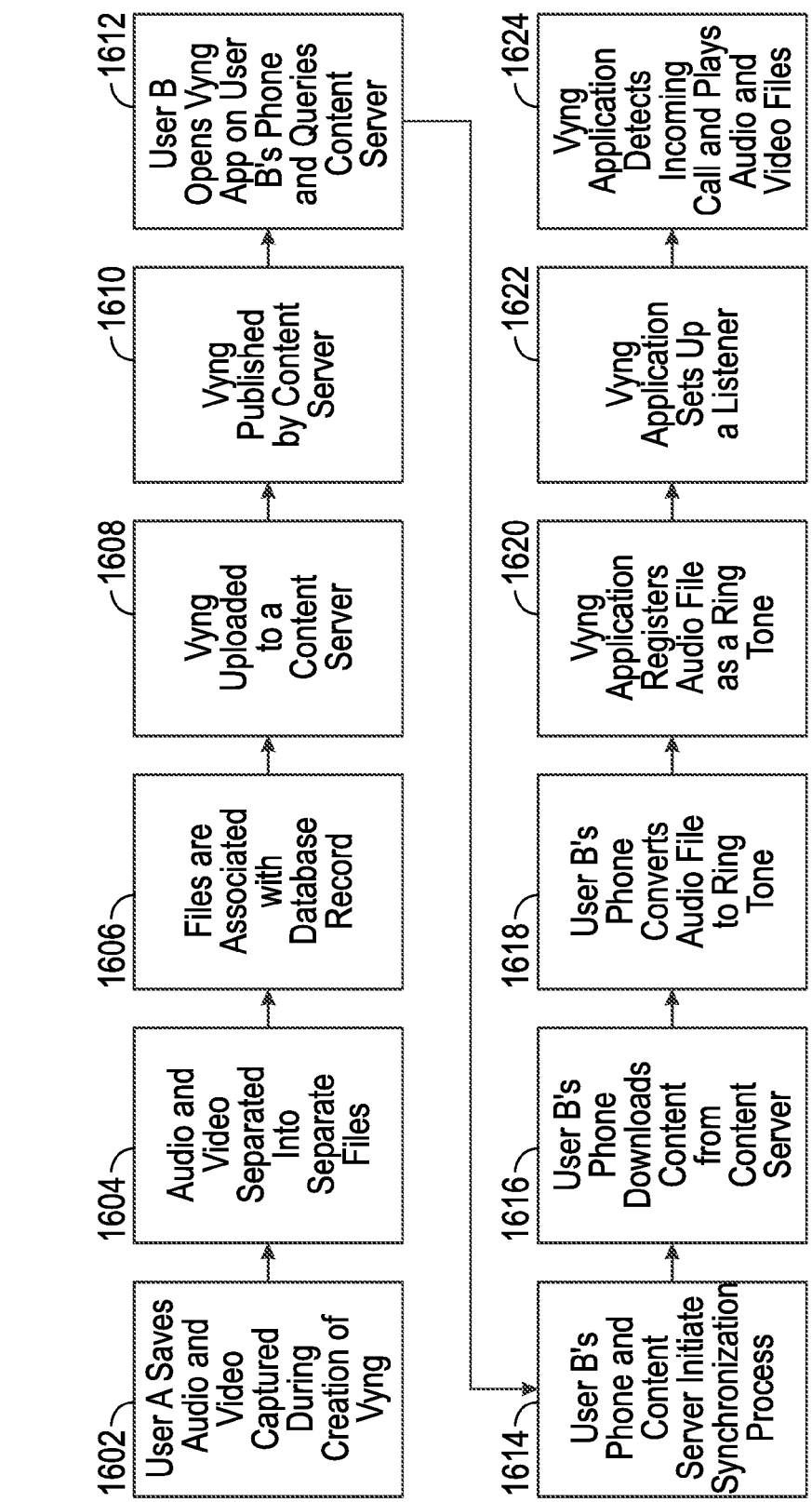
FIG. 16 illustrates a process for transferring an SCCMC from User A to User B in accordance with an embodiment of the systems and methods disclosed herein.

FIG. 16 depicts steps of a method for enabling delivery of an SCCMC tone from the first user (User A) to the second user (User B), according to an embodiment. First, in a step 1602, the first user, referred to herein as User A, may save audio and video captured during creation of the SCCMC tone, which may include audio and video captured by a video camera of the user's phone, audio and/or video retrieved from saved files, and/or video and/or audio retrieved from other sources, such as found in a search, retrieved from storage (including in the cloud), or the like. Next, in a step 1604, the audio and video may be separated into two separate files, one for audio and one for video.

Next, in a step 1606, the files may be associated with a database record that may store information about the SCCMC tone, such as the identifying information for User A, identifying information and property information for the audio file and the video file, and metadata, such as further information about user A and information about how User A wishes to share the SCCMC tone. At a step 1608 the SCCMC tone may be uploaded from User A's mobile phone 102, such as a smart phone, to a content server 112, and at a step 1610 the content server 112 may publish the SCCMC tone along with certain privacy controls that are based on preferences of User A, such as whether the SCCMC tone is just for User A, is intended to be shared with another party (referred to here as User B or the second user) or parties, or is intended to be public. Such privacy controls for a given SCCMC tone may be captured in the application that User A uses on User A's device to create and upload the SCCMC tone.

Next, at a step 1612, User B may open the App on User B's mobile phone 104, which queries the content server 112 to assess what is available to User B's mobile phone 104 in a feed that is associated with User B, which may include User B's own creations, content shared with User B by others (such as User A), and public content published by various users. The content server 112 and User B's mobile phone 104 may undertake a synchronization process at step 1614, where a difference is determined between the available feed on the content server 112 and the content already on User B's phone, after which at a step 1616 User B's mobile phone 104 downloads any content not already present on User B's phone from the content server 112. Once the updated SCCMC tone data is downloaded, the SCCMC App on User B's mobile phone 104 may turn the audio file portion of the SCCMC tone into a ring tone at step 1618, which is a special class or format that typically has its own registry in mobile operating systems, such as the Android™ or IOS™ mobile operating systems, deployed on certain smart phones. At a step 1620 the SCCMC App may register the audio file associated with the SCCMC tone in the ringtone registry as a ringtone. Next, at a step 1622, the SCCMC tone may set up a listener, using the feature of the operating system that enables listening for incoming phone calls (which in the case of devices running the Android™ mobile operating system is enabled by an SDK for the operating system). The SCCMC App may access native APIs exposed by the Android™, IOS™ or other operating system to listen for a call. At a step 1624, if an incoming call is detected from a number (e.g., the number of User A) that has a tone associated with it on User B's mobile phone 104, the SCCMC App retrieves the audio and/or video file portions of the SCCMC tone that was downloaded and the audio file portion and video file portion may be played individually or together.

In some closed operating system environments, one cannot detect an incoming phone call or set the user's ringtone for the user. In such cases the content server 112 may just update contact information on User B's mobile phone 104, such as allowing User B to save an SCCMC tone for calls from User A, but in such cases possibly requiring actions for User B that are not needed in other situations. In embodiments the content server 112 may also push notifications to users, so that User B can view User A's content that was shared for User B.

In embodiments, such as involving closed operating systems, an SCCMC content tone may be downloaded and stored on User B's mobile phone 104 for later access, such as at a time when the operating system makes available the ability to listen to a call, or at such time as the user elects to have the phone "jailbroken" or otherwise made open.

In embodiments other ways to share content may involve the P2P transfer of an SCCMC tone, optionally with separated audio and video components, directly from a phone of a first user to a second user, without requiring a content server 112 or client-server arrangement, or with the content server 112 supplying a complementary role, but not being required for the transfer of the SCCMC. This may include using the Airdrop™ function in phones that use the IOS™ operating system or similar P2P transfer functions in other operating systems, such as Android™.

Figure 17A:
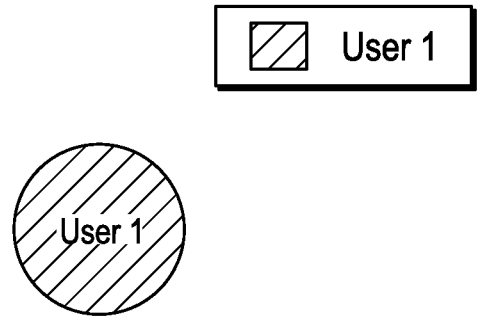
FIGS. 17A-17D illustrate user community growth of an SCCMC through a viral sharing effect in accordance with an embodiment of the systems and methods disclosed herein.
Figure 17B:
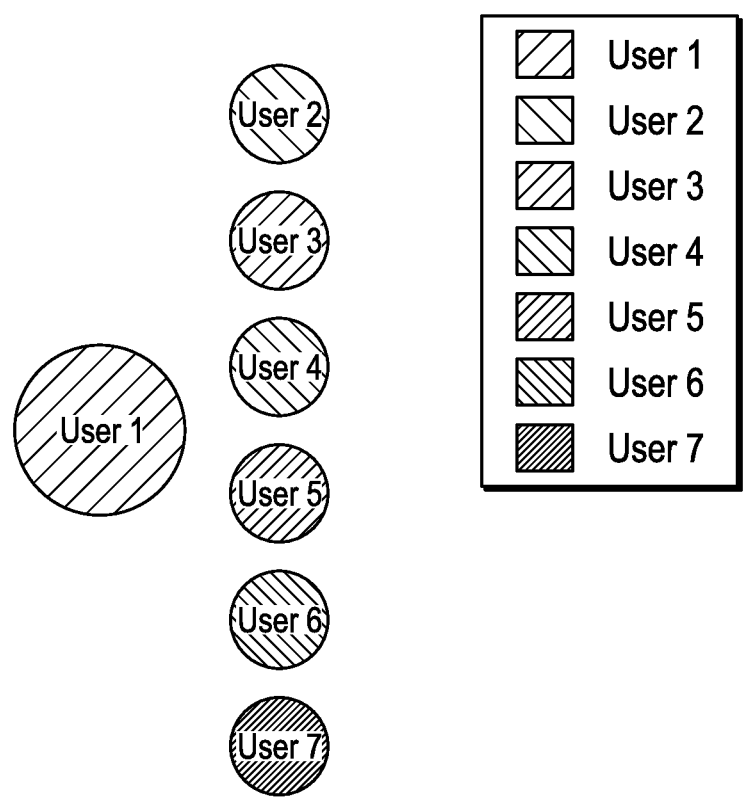
Figure 17C:
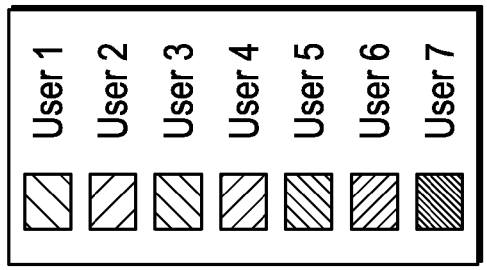
Figure 17C:
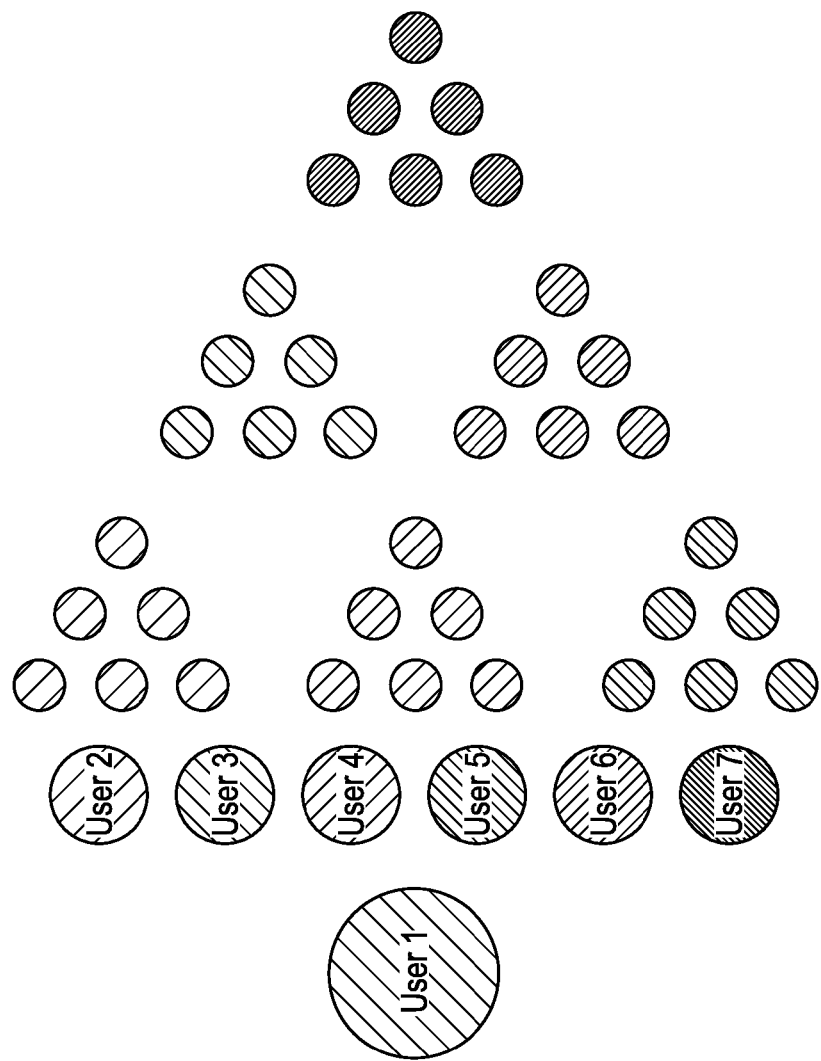
Figure 17D:
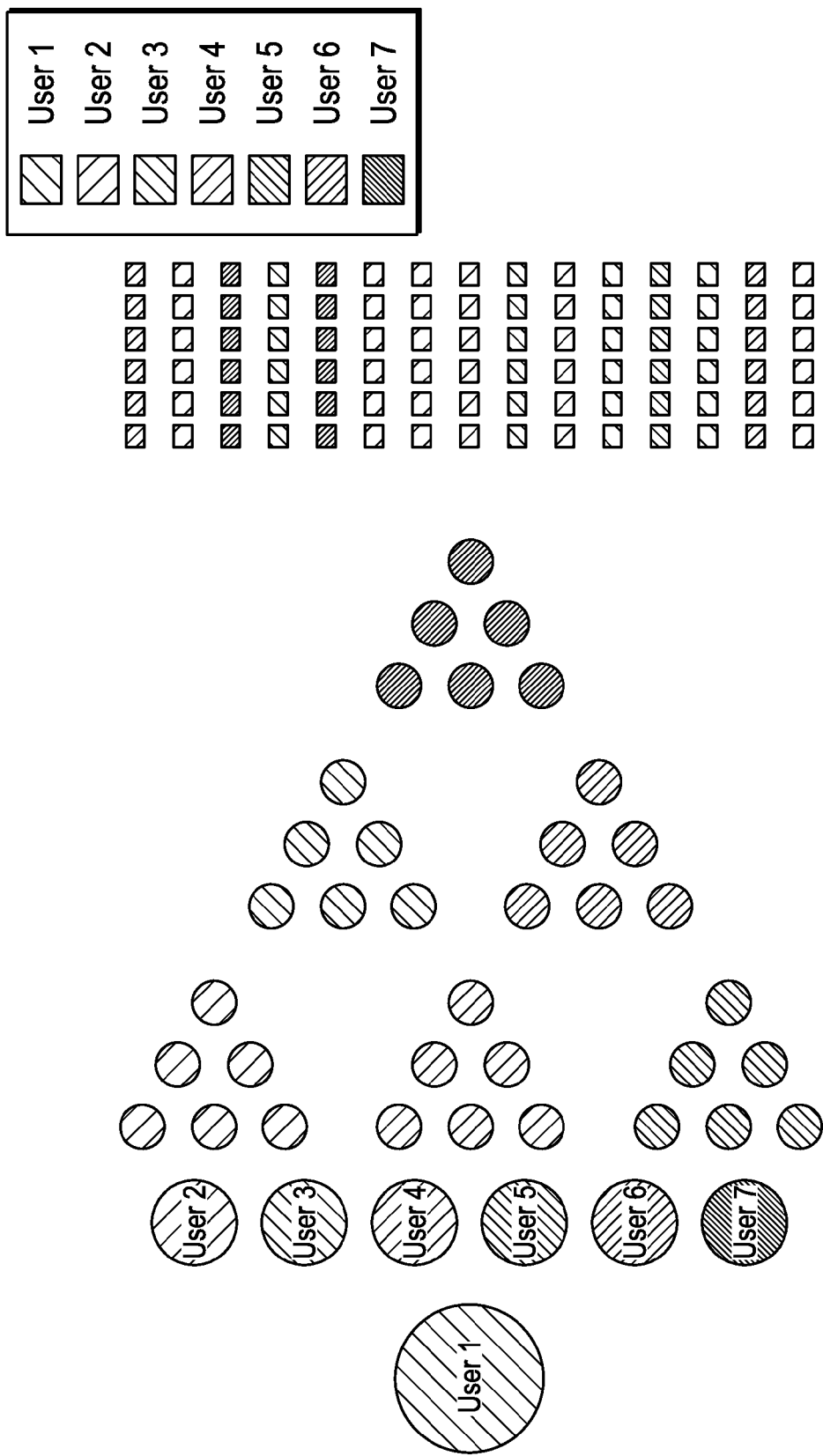

FIGS. 17A-D illustrate a user community growth through viral sharing effects. FIG. 17A illustrates a first user who has created an SCCMC tone. FIG. 17B illustrates the first user sharing the SCCMC tone with a first set of recipients. As illustrated in FIG. 17C, upon receipt of the SCCMC tone from the first user, the first recipients create and share their own SCCMC tones with a second set of recipients and the first set of recipients become users of the SCCMC tones in the process. FIG. 17D illustrates the second set of recipients then sharing their own SCCMC tones with a third set of recipients, as the second set of recipients become users of the SCCMC tones in the process, continuing the growth cycle.

Figure 18A:
FIGS. 18A-18C illustrate monetization examples of an SCCMC in accordance with an embodiment of the systems and methods disclosed herein.
Figure 18B:
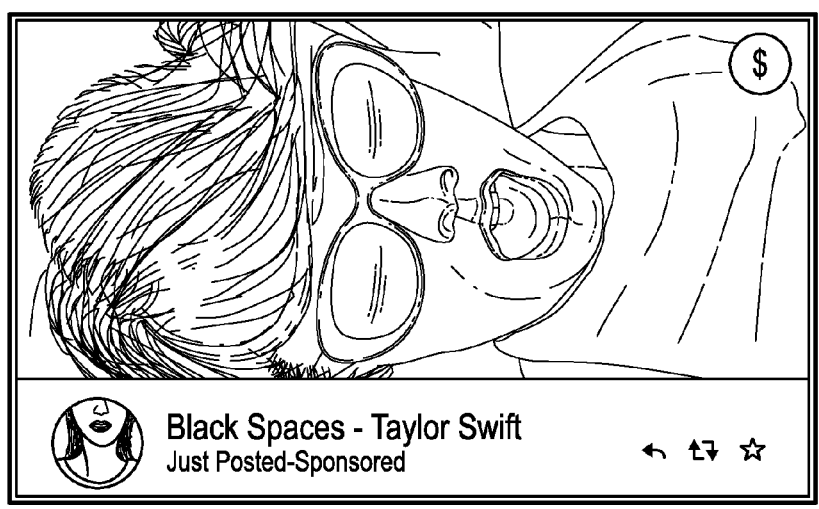
Figure 18C:

FIGS. 18A-C illustrate monetization examples. FIG. 18A illustrates built-in advertising opportunities made available by a recipient of an SCCMC tone asking the sender of the SCCMC how sender created/used/shared a sender-controlled SCCMC. FIG. 18B illustrates a premium sender-controlled SCCMC tone as posted on a content feed. A premium SCCMC tone may support content taken from a marketplace for content creators. The marketplace for content creators may include SCCMC tone creation add-ons and brand promotional content. Brand promotional content be directly uploaded to the marketplace by brands and may include brand songs.

A creator of an SCCMC may select content from the marketplace to include in the SCCMC that the user is creating. A creator of an SCCMC may select content from a content library that is made available by the marketplace to the creator of the SCCMC. The market place may make available SCCMC content add-ons, which may include voice manipulation functions, photo filters, video filters, and the like. A premium SCCMC may also include promotional content for brands. An affiliate code may be linked to a SCCMC or a particular content component, such as an audio or video file, included in an SCCMC. Content may be ranked, rated, shared, liked, or subscribed to by content creators, content senders, or content recipients.

FIG. 18C illustrates an example of advertising in a sender-controlled SCCMC, in which an advertisement is displayed to a second user when a first user calls or sends a text message to a second user. An advertisement may include image components, audio components, video components, and the like.

In another example, a sender of an SCCMC tone may associate a song with an SCCMC tone and choose to have that song play on the mobile device of a recipient when the sender calls or sends a text message to that recipient. The song may be a song performed by a favorite artist, another favorite song, and the like. In yet another example, a pre-recorded message from a celebrity personality may play on the phone of a recipient of an SCCMC tone when the sender of the SCCMC tone calls or sends a text message to the recipient. The pre-recorded message may be selected based on how the recipient chooses to interact with the call or text message by either accepting, rejecting, or replying to the call or message.

Figure 19:
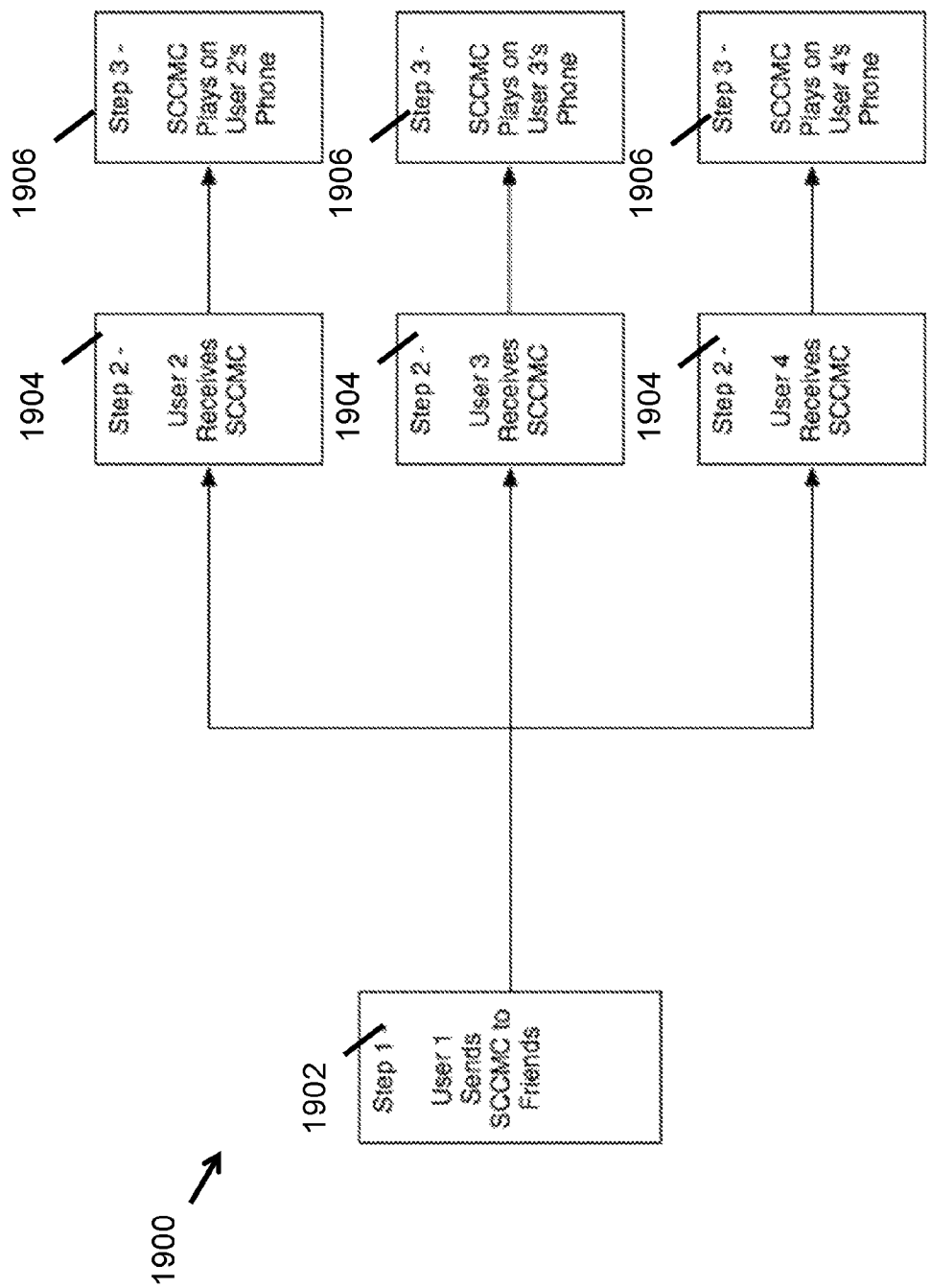
FIGS. 19-21 illustrate trigger examples of an SCCMC in accordance with an embodiment of the systems and methods disclosed herein.

FIG. 19 illustrates flow 1900 in which an SCCMC that may be triggered to play by the sending of an SCCMC from a user to a friend or group of friends. In the example illustrated in FIG. 19, a first user may send an SCCMC to a group of friends, shown in this example as a second user, a third user and a fourth user, as illustrated in first step 1902. In a second step 1904, the second user, third user and fourth user may receive the SCCMC from the first user. In a third step 1906, the SCCMC may play immediately on the screen of the second user's mobile phone when the SCCMC is received on the second user's mobile phone, the screen of the third user's mobile phone when the SCCMC is received on the third user's mobile phone and the screen of the fourth user's mobile phone when the SCCMC is received on the fourth user's mobile phone. An SCCMC that may be triggered to play by the sending of an SCCMC from a user to a friend or group of friends may be referred to as a "Vyng Bomb", in some cases. It may be noted that the SCCMC may be delivered, as described in connection with FIGS. 2B and 2C, over transmission layers of voice and data networks, so that user 2 might receive the SCCMC over a data network and play it upon initiation of a VOIP call, while user 3 might receive the SCCMC over a voice network, such that the SCCMC tone is played on the screen of user 3's phone when the call is received. In embodiments, the trigger to play the SCCMC may comprise a push notification over a data network without involving a phone call. The SCCMC may, in such embodiments, play and immediately disappear without there ever existing a phone call or a VoIP call.

Figure 20:
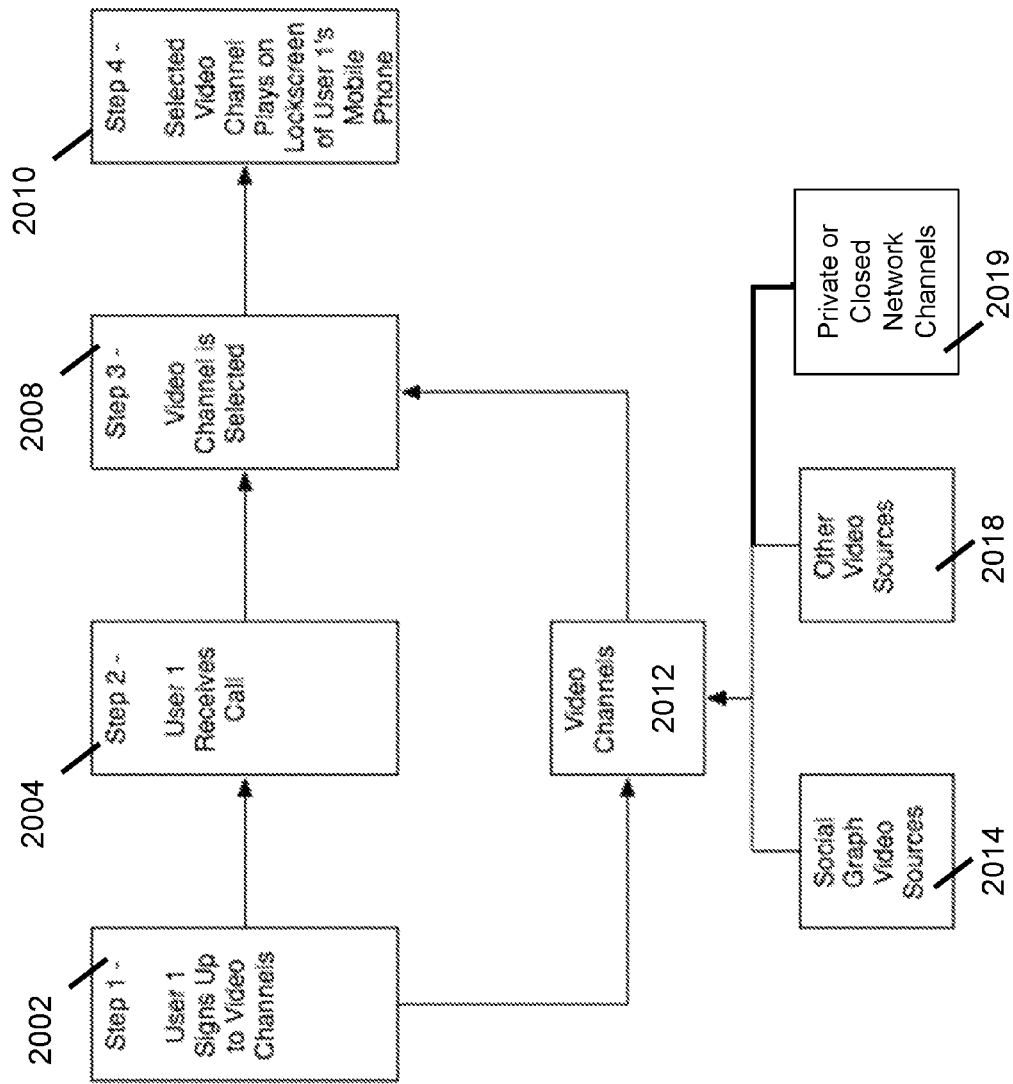

FIG. 20 illustrates an SCCMC that may be selected from a set of video content. In a first step 2002, a first user may sign up to receive content from one or more video channels 2012. Video channels 2002 may be selected from social graph video sources 2014 or other video sources 2018, such as libraries curated by editors or curated automatically, such as by one or more algorithms that identify and aggregate content based on, for example, a defined topic of interest. Social graph video sources 2014 may be created in the SCCMC App or found in other apps from the social graph of a user, such as videos from Facebook™, Twitter™, LinkedIn™, SnapChat™, Periscope™ and the like. Other video sources 2018 may include local sports team video sources, world news video sources, trending videos in categories video sources, top music video sources and the like. Local sports team video sources may include the latest highlights from local teams, the favorite teams of the first user and the like. World news video sources may include the latest world news. Trending videos in categories video sources may include trending videos in a category such as "cats", for example. Top music video sources may include clips of trending music videos. Once a user has signed up, in a second step 2004, the first user may receive a call. In a third step 2008, a video channel may be selected after the first user receives a call. In a fourth step 2010, a video from the video channel selected in the step 2008 may play on the screen of the first user's mobile phone. In embodiments, in addition to or as an alternative to the user's social graph, there may be one or more private or closed-network channels 2019 that users can create and into which they can add their own videos. These private channels 2019 may be made available by invitation (and optionally closed to uninvited users). For example, there can be a channel #UCLA where only students who attend the university receive permission to view and participate video content within the channel, such as, in embodiments, via some combination of invitation, password, and location (such as by use of a geofence relating to a location of the university).

In the various embodiments described throughout this disclosure, an SCCMC may also be a live look video. A live look video may allow a second user to receive a live look at first user, when a first user sends an SCCMC or otherwise initiates a call to a second user. A live look may allow the second user to immediately see the face of the first user upon receipt of the SCCMC from the first user or notification that the first user is calling the second user. The live look video may play on the screen of the device of the second user, such as the lock screen, home screen, or other screen. A live look video may be generated by initiating a live video stream. A live video stream may be initiated using a live video stream generator. A live stream generator may be an application, such as Skype, Facetime, Periscope, or the like. A live video stream may also be recorded and sent as a series of small video segments. A live look video may be viewed through the window that an SCCMC app has opened on the screen of a user's mobile phone.

Figure 21:
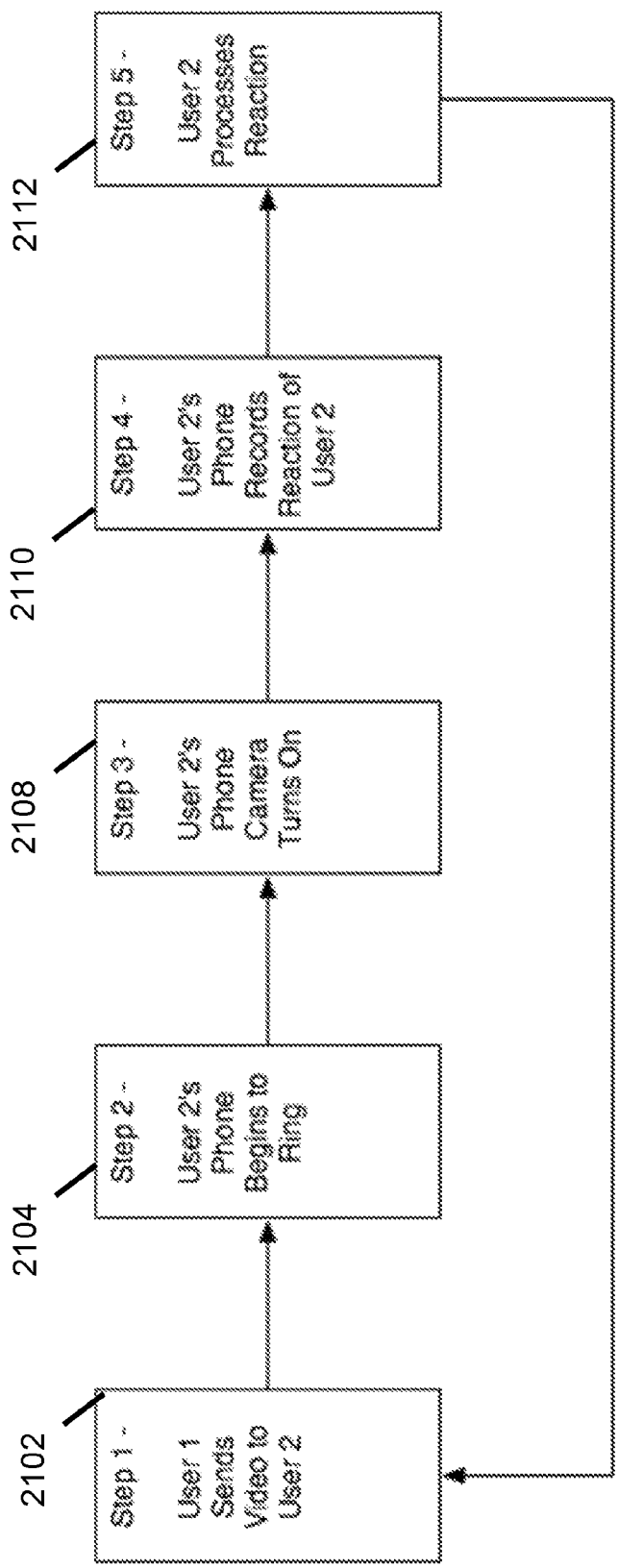

Sending an SCCMC may include automatically recording a user's reaction to an SCCMC, as illustrated in FIG. 21. In a first step 2102, a first user may send an SCCMC to a second user. The second user may receive the SCCMC from the first user in a second step 2104. The mobile phone of the second user may record the reaction of the second user in a third step 2018, such as by having the SCCMC include instructions to turn on the camera of the recipient's phone facing in the direction of the recipient. At a fourth step 2110, the recipient's phone may turn on the camera and record the reaction of the recipient. In embodiments, the second user may give permission to the second user's mobile phone to record the reaction of the second user. Permission may be given by the second user to the second user's mobile phone to record the reaction of the second user prior to receipt of the SCCMC, upon receipt of the SCCMC, before the SCCMC begins to play and the like. In a step 2112, the recipient user may be offered options to process the reaction, such as being given an option to save, upload or share the second user's reaction.

Figure 22:
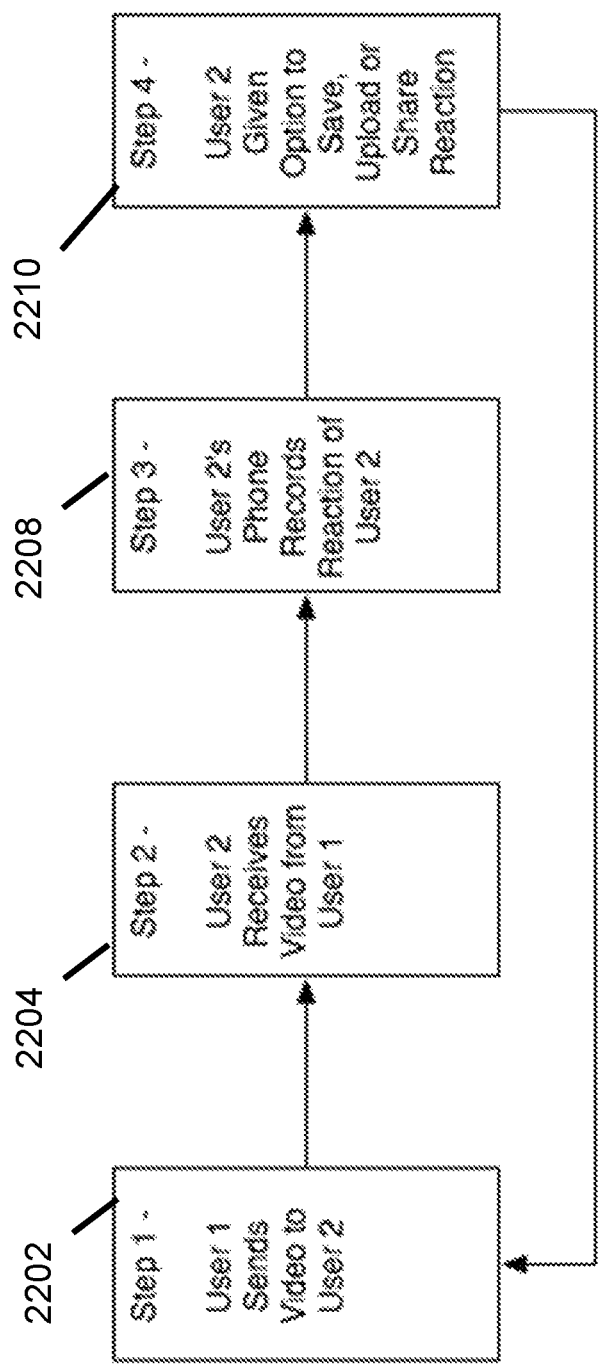
FIG. 22 illustrates a flow in which a second user's reaction to an SCCMC is recorded and shared with another party.
Figure 23:
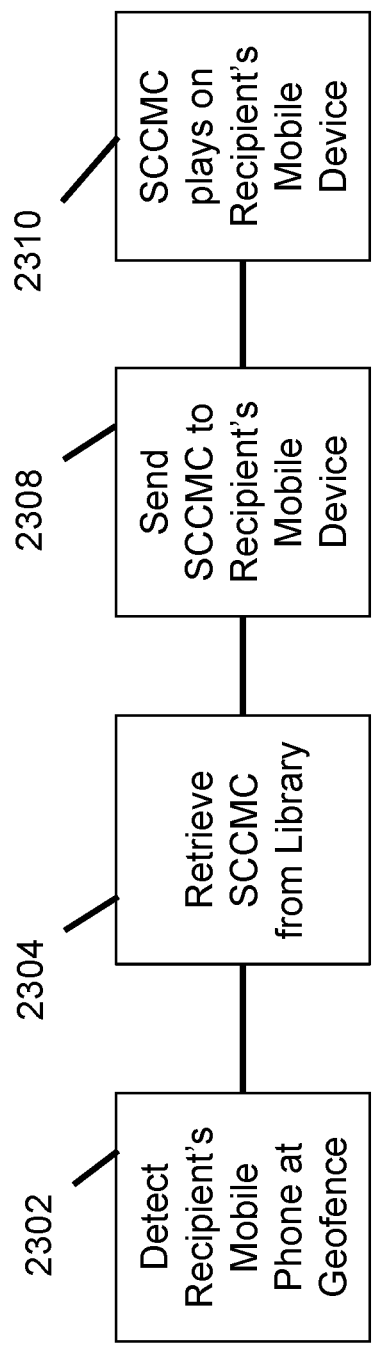
FIG. 23 illustrates a flow in which the playing of an SCCMC may be triggered by a triggering event.

FIG. 22 shows an alternative embodiment of a flow for obtaining a reaction to an SCCMC. After the sender sends the SCCMC in a step 2202, the recipient receives the SCCMC at a step 2204, and the recipient's phone records the recipient's reaction at a step 2208, the recipient may be given an option at a step 2210 to save, upload, or share the reaction, such as with the sender, with the social circle of the recipient, or otherwise, including the option to store the reaction as an SCCMC, such as in a library of SCCMC content.

Figure 24:
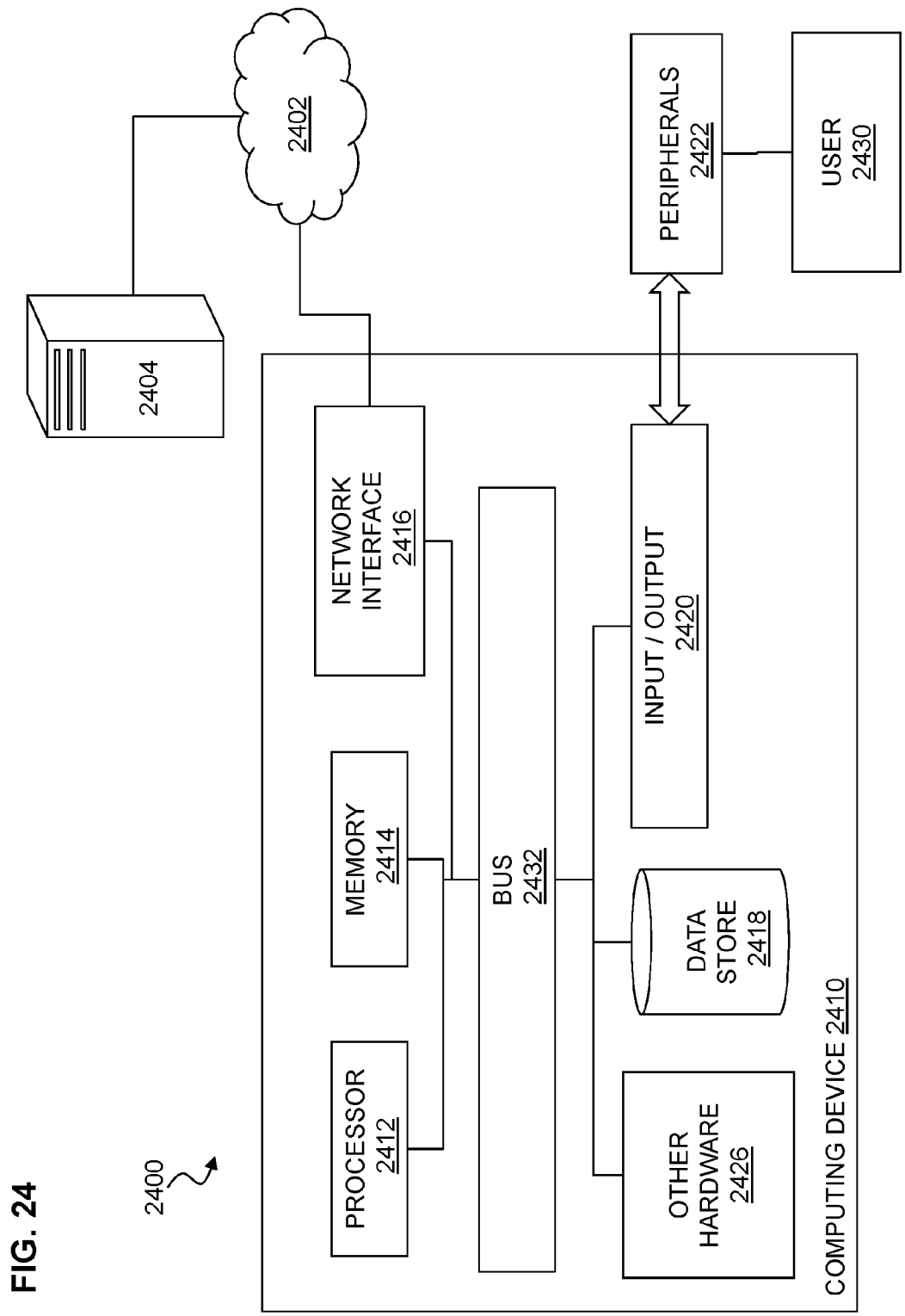
FIG. 24 illustrates a computer system.

FIG. 24 illustrates a flow in which the playing of an SCCMC may be triggered by a triggering event, such as entry of a recipient's mobile device into a location, such as defined by a geofence. At a step 2302 the location of the recipient's device may be detected at a location, such as defined by a geofence (or otherwise detected at a location according to various location systems known to those of skill in the art of mobile telecommunications). The geofence may surround, by way of example, a point of interest, such as a location within a museum, park, or exhibit, a store or other location relevant to promotion or sale of products or services, an educational location within a school, college, or university, or any other location for which there may be relevant content that can be presented via an SCCMC. Upon detection at the step 2302, an SCCMC can be retrieved at a step 2304, such as from a library of SCCMCs. This may include retrieving content that is associated with the location (such as content about a nearby museum exhibit or a nearby product) and may include retrieving content relevant to the recipient (such as content relating to that recipient's preferences, as indicated by selection of channels, by reactions to particular content, by the recipient's preferences as indicated by other data sources (such as purchases, interactions with content, or the social graph of the recipient), or the like. An SCCMC can be retrieved based in part on whether the recipient has visited the location before (information which may be stored by the host system or stored locally at the computing infrastructure for a geofence), so that the SCCMC can be varied for repeat visitors. The content server may retrieve an appropriate SCCMC and, at a step 2308, send it to the recipient's mobile device. Then the SCCMC may play on the device 2310 as described in connection with various embodiments described throughout this disclosure.

FIG. 24 illustrates a computer system, e.g., a computer system that may be used in conjunction with the devices, systems, and methods described herein. In general, the computer system 2400 may include a computing device 2410 connected to a network 2402, e.g., through an external device 2404. The computing device 2410 may be or include any type of client or other network endpoint as described herein, e.g., a mobile device as described throughout this disclosure. The computing device 2410 may also or instead be any device suitable for interacting with other devices over a network 2402, such as a laptop computer, a desktop computer, a personal digital assistant, a tablet, a mobile phone, a television, a set top box, a wearable computer, and the like. The computing device 2410 may also or instead include a server such as any of the servers described herein.

In certain aspects, the computing device 2410 may be implemented using hardware (e.g., in a desktop computer), software (e.g., in a virtual machine or the like) or a combination of software and hardware. The computing device 2410 may be a standalone device, a device integrated into another entity or device, a platform distributed across multiple entities, or a virtualized device executing in a virtualization environment.

The network 2402 may include any network described above, e.g., data network(s) or internetwork(s) suitable for communicating data and control information among participants in the computer system 2400. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 2400. The network 2402 may also include a combination of data networks, and need not be limited to a strictly public or private network.

The external device 2404 may be any computer or other remote resource that connects to the computing device 2410 through the network 2402. This may include gateways or other network devices, remote servers or the like containing content requested by the computing device 2410, a network storage device or resource, or any other resource or device that might connect to the computing device 2410 through the network 2402.

In general, the computing device 2410 may include a processor 2412, a memory 2414, a network interface 2416, a data store 2418, and one or more input/output interfaces 2420. The computing device 2410 may further include or be in communication with peripherals 2422 and other external input/output devices that might connect to the input/output interfaces 2420.

The processor 2412 may be any processor or other processing circuitry capable of processing instructions for execution within the computing device 2410 or computer system 2400. The processor 2412 may include a single-threaded processor, a multi-threaded processor, a multi-core processor and so forth. The processor 2412 may be capable of processing instructions stored in the memory 2414 or the data store 2418.

The memory 2414 may store information within the computing device 2410. The memory 2414 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 2414 may store program instructions, program data, executables, and other software and data useful for controlling operation of the computing device 2410 and configuring the computing device 2410 to perform functions for a user. The memory 2414 may include a number of different stages and types of memory for different aspects of operation of the computing device 2410. For example, a processor may include on-board memory and/or cache for faster access to certain data or instructions, and a separate, main memory or the like may be included to expand memory capacity as desired. All such memory types may be a part of the memory 2414 as contemplated herein.

The memory 2414 may, in general, include a non-volatile computer readable medium containing computer code that, when executed by the computing device 2410 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 2414 is depicted, it will be understood that any number of memories may be usefully incorporated into the computing device 2410. For example, a first memory may provide non-volatile storage such as a disk drive for permanent or long-term storage of files and code even when the computing device 2410 is powered down. A second memory such as a random access memory may provide volatile (but higher speed) memory for storing instructions and data for executing processes. A third memory may be used to improve performance by providing higher speed memory physically adjacent to the processor 2412 for registers, caching, and so forth.

The network interface 2416 may include any hardware and/or software for connecting the computing device 2410 in a communicating relationship with other resources through the network 2402. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 2410 and other devices. The network interface 2416 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 2416 may include any combination of hardware and software suitable for coupling the components of the computing device 2410 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 2402 such as the Internet. This may also or instead include hardware/software for a WiMax connection or a cellular network connection (using, e.g., CDMA, GSM, LTE, or any other suitable protocol or combination of protocols). The network interface 2416 may be included as part of the input/output devices 2420 or vice-versa.

The data store 2418 may be any internal memory store providing a computer-readable medium such as a disk drive, an optical drive, a magnetic drive, a flash drive, or other device capable of providing mass storage for the computing device 2410. The data store 2418 may store computer readable instructions, data structures, program modules, and other data for the computing device 2410 or computer system 2400 in a non-volatile form for subsequent retrieval and use. For example, the data store 2418 may store without limitation one or more of the operating system, application programs, program data, databases, files, and other program modules or other software objects and the like.

The input/output interface 2420 may support input from and output to other devices that might couple to the computing device 2410. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 2416 for network communications is described separately from the input/output interface 2420 for local device communications, these two interfaces may be the same, or may share functionality, such as where a USB port is used to attach to a WiFi accessory, or where an Ethernet connection is used to couple to a local network attached storage.

A peripheral 2422 may include any device used to provide information to or receive information from the computing device 2400. This may include human input/output (I/O) devices such as a keyboard, a mouse, a mouse pad, a track ball, a joystick, a microphone, a foot pedal, a camera, a touch screen, a scanner, or other device that might be employed by the user 2430 to provide input to the computing device 2410. This may also or instead include a display, a speaker, a printer, a projector, a headset or any other audiovisual device for presenting information to a user. The peripheral 2422 may also or instead include a digital signal processing device, an actuator, or other device to support control or communication to other devices or components. Other I/O devices suitable for use as a peripheral 2422 include haptic devices, three-dimensional rendering systems, augmented-reality displays, magnetic card readers, and so forth. In one aspect, the peripheral 2422 may serve as the network interface 2416, such as with a USB device configured to provide communications via short range (e.g., BlueTooth, WiFi, Infrared, RF, or the like) or long range (e.g., cellular data or WiMax) communications protocols. In another aspect, the peripheral 2422 may provide a device to augment operation of the computing device 2410, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 2400 may be used as a peripheral 2422 as contemplated herein.

Other hardware 2426 may be incorporated into the computing device 2400 such as a co-processor, a digital signal processing system, a math co-processor, a graphics engine, a video driver, and so forth. The other hardware 2426 may also or instead include expanded input/output ports, extra memory, additional drives (e.g., a DVD drive or other accessory), and so forth.

A bus 2432 or combination of busses may serve as an electromechanical platform for interconnecting components of the computing device 2400 such as the processor 2412, memory 2414, network interface 2416, other hardware 2426, data store 2418, and input/output interface. As shown in the figure, each of the components of the computing device 2410 may be interconnected using a system bus 2432 or other communication mechanism for communicating information.

Methods and systems described herein may be realized using the processor 2412 of the computer system 2400 to execute one or more sequences of instructions contained in the memory 2414 to perform predetermined tasks. In embodiments, the computing device 2400 may be deployed as a number of parallel processors synchronized to execute code together for improved performance, or the computing device 2400 may be realized in a virtualized environment where software on a hypervisor or other virtualization management facility emulates components of the computing device 2400 as appropriate to reproduce some or all of the functions of a hardware instantiation of the computing device 2400.

In one aspect, the computing device 2400 may be a mobile device such as that described below.

Figure 25:
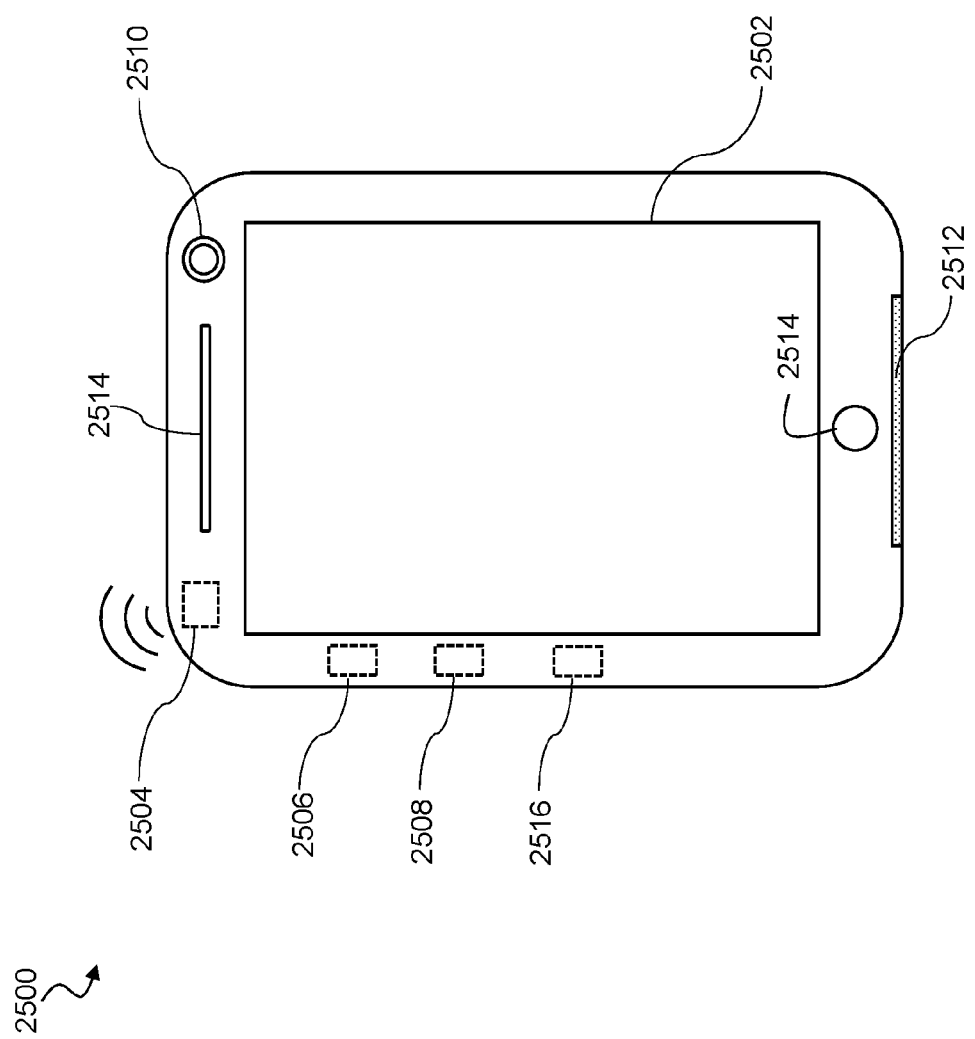
FIG. 25 illustrates a mobile device.

FIG. 25 illustrates a mobile device. The mobile device 2500 may be configured for creating, sending, or receiving a SCCMC as described herein. The mobile device 2500 may be, for example, any of the endpoints or other computing devices described above. The mobile device 2500 may be, for example, a smart phone or a tablet. In general, the mobile device 2500 may include a display 2502 (e.g., a screen), a communications interface 2504 configured to couple the mobile device 2500 in a communicating relationship with a network, a processor 2506, a memory 2508, a camera 2510, a microphone 2512, a speaker 2514, and a location tracking device 2516.

The communications interface 2504 may include hardware and software for communications using a variety of protocols such as a short range communications protocol (e.g., Bluetooth), a wireless communications protocol (e.g., Wi-Fi, cellular network, and so on), and so forth. The communications interface 2504 may couple the mobile device 2500 to a cellular network or the like through a mobile carrier with which a user has a billing account. The communications interface 2504 may also or instead couple the mobile device 2500 to a data network through which the mobile device 2500 can access an online application store or the like. The communications interface 2504 may also or instead couple the mobile device 2500 to other mobile devices through a data network such as any of the networks described herein.

In an aspect, the memory 2508 bears computer code that, when executing on the processor 2506, performs steps for creating, sending, receiving, editing, and so on, a SCCMC data structure or the like. The memory 2508 may also or instead bear computer code that forms an application for the mobile device 2500, e.g., execution by the processor 2506 on the mobile device 2500.

The display 2502 may include screen such as a touch screen or other user interface for receiving user input as contemplated herein, e.g., for the creation or editing of SCCMC. The display 2502 may also or instead display SCCMC for a user.

The camera 2510 may be used for capturing images or video for use in an SCCMC.

The microphone 2512 may be used for receiving a voice or audio signal as described herein.

The speaker 2514 may be used for playing audio from an SCCMC for a user. The speaker 2514 may instead include an audio output on the mobile device 2500 such as a headphone jack or the like.

The location tracking device 2516 may be used to establish a location for the mobile device 2500, e.g., for proximity services as contemplated herein. The location tracking device 2516 may include a GPS receiver or the like.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure. All documents referenced herein are hereby incorporated by reference.

What is claimed is:

1. A system, comprising:
    a contact media content data structure created using a mobile device;
    a host computing system including at least one server for managing the contact media content data structure; and
    an installable application running on the host computing system for establishing a data connection with at least one mobile device of at least one call recipient,
    wherein the installable application is configured to allow discovery of peer devices in proximity to allow an exchange of the contact media content data structure between mobile devices of users of the host computing system, and
    wherein the contact media data structure is displayed on a screen of a call recipient's mobile device when the call recipient's mobile device is turned on and able to receive at least one of a data signal and a voice signal, and wherein a plurality of contact media data structures are organized into a channel that is personalized by the call recipient such that the call recipient's mobile device plays at least one of a series of contact media data structures upon occurrence of at least one of a plurality of contact events.

2. The system of claim 1, wherein the contact media content data structure uses voice layer and data layer transmission mediums in a single broadcast act by one or more of a sender or the call recipient.

3. The system of claim 1, wherein the screen of the call recipient's mobile device is the screen that displays upon occurrence of a contact event at the call recipient's mobile device.

4. The system of claim 1, wherein the screen of the call recipient's mobile device is one or more of a lock-screen of the call recipient's mobile device and a home screen of the call recipient's mobile device.

5. The system of claim 1, wherein the screen of the call recipient's mobile device is one or more of an active screen of the call recipient's mobile device that displays when the call recipient's mobile device is unlocked and a screen that displays while the call recipient is on a phone call using the call recipient's mobile device.

6. The system of claim 1, wherein the installable application enables a user interface that allows creation of the contact media content data structure on the at least one mobile device of the at least one call recipient.

7. The system of claim 1, wherein the host computing system enables downloading of the contact media content data structure on the at least one mobile device of the at least one call recipient.

8. The system of claim 1, wherein the call recipient's mobile device is communicatively coupled to the at least one server, and wherein the at least one server includes a content server.

9. The system of claim 8, wherein the contact media content data structure is played on at least one of a lockscreen, a home screen, an active application screen, a screen displayed during a phone call, and a screen displayed upon a contact event on the call recipient's mobile device.

10. The system of claim 1, wherein the channel is associated with at least one of a topic of interest to the call recipient and a social graph of the call recipient.

11. The system of claim 1, wherein the contact media data structure is selected by the call recipient from a library of contact media data structures.

12. The system of claim 11, wherein the library is curated by an algorithm based on a topic of interest indicated by the call recipient.

13. The system of claim 11, wherein the library is curated by an editor based on a subject matter of the channel.

14. A method, comprising:
establishing a data connection with at least one mobile device of at least one call recipient through an installable application running on a host computing system;
discovering peer devices in proximity to allow an exchange of contact media content data structures between mobile devices of users of the host computing system;
receiving a contact media content data structure that is created using a mobile device;
displaying the content media data structure on a screen of a call recipient's mobile device when the call recipient's mobile device is able to receive at least one of a data signal and a voice signal; and
organizing a plurality of contact media data structures into a channel that is personalizable by the call recipient such that the call recipient's mobile device plays at least one of a series of contact media data structures upon occurrence of at least one of a plurality of contact events.

15. The method of claim 14 further comprising providing a user interface on the mobile device that allows for creation of the contact media content data structure.

16. The method of claim 14, wherein the contact media content data structure is created using the mobile device of one or more of a sender or the call recipient by selecting the contact media content data structure from a library provided by the host computing system and downloading the selected contact media content data structure from the host computing system.

17. The method of claim 14, wherein the contact media content data structure is received by one or more of the host computing system and the call recipient's mobile device.

18. The method of claim 14 further comprising sending the content media data structure to the call recipient's mobile device.

* * * * *